United States Patent
Westphal

(10) Patent No.: US 10,484,271 B2
(45) Date of Patent: Nov. 19, 2019

(54) DATA UNIVERSAL FORWARDING PLANE FOR INFORMATION EXCHANGE

(71) Applicant: Futurewei Technologies, Inc., Plano, TX (US)

(72) Inventor: Cedric Westphal, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 182 days.

(21) Appl. No.: 15/471,953

(22) Filed: Mar. 28, 2017

(65) Prior Publication Data

US 2018/0287940 A1    Oct. 4, 2018

(51) Int. Cl.
*H04L 12/741* (2013.01)
*H04L 12/725* (2013.01)
*H04L 29/08* (2006.01)

(52) U.S. Cl.
CPC .......... *H04L 45/306* (2013.01); *H04L 45/745* (2013.01); *H04L 67/327* (2013.01)

(58) Field of Classification Search
CPC ...... H04L 45/44; H04L 67/327; H04L 45/745
See application file for complete search history.

(56) References Cited

U.S. PATENT DOCUMENTS

| | | | | |
|---|---|---|---|---|
| 2013/0060962 A1* | 3/2013 | Wang | ............... | H04L 67/327 709/238 |
| 2013/0151584 A1 | 6/2013 | Westphal | | |
| 2013/0275544 A1 | 10/2013 | Westphal | | |
| 2014/0173018 A1 | 6/2014 | Westphal et al. | | |
| 2014/0189060 A1 | 7/2014 | Westphal | | |
| 2014/0233575 A1* | 8/2014 | Xie | ............... | H04L 45/44 370/400 |
| 2015/0006621 A1 | 1/2015 | Westphal | | |
| 2016/0036689 A1 | 2/2016 | Avci et al. | | |
| 2016/0142510 A1 | 5/2016 | Westphal et al. | | |

OTHER PUBLICATIONS

Jacobson, V., et al., "Networking named content," in Proceedings of the 5th International Conference on Emerging Networking Experiments and Technologies, ACM, Oct. 2009, pp. 1-12.

(Continued)

*Primary Examiner* — Vinncelas Louis
(74) *Attorney, Agent, or Firm* — Vierra Magen Marcus LLP

(57) ABSTRACT

Interest packets are provided that include a dual control plane and forwarding plane function that avoids the asymmetry associated with traditional information centric networking. Interest packets are used to update the control plane for routing purposes, as well as to request data from the content caches and providers. Instead of identifying a return path, the interest packets include an identifier of other content advertised by the client device issuing the interest packet. An advertised content identifier is stored in a data structure with an identification of the corresponding client device. Data packets include the advertised content identifier of the corresponding interest packet, in addition to the name of the requested content. When a data packet is received for requested content, the advertised content identifier is used to determine where to route the data packet.

13 Claims, 15 Drawing Sheets

(56) References Cited

OTHER PUBLICATIONS

Parc, a Xerox Company, "CCNx," downloaded from on Mar. 30, 2017, 2 pages.
NDN, "Named Data Networking," downloaded from on Mar. 30, 2017, 11 pages.
Sevilla, S., et al., "iDNS: Enabling Information Centric Networking Through the DNS," in Computer Communications Workshops (INFOCOM WKSHPS), IEEE INFOCOM Workshops on Name-Oriented Mobility, Apr. 2014, 6 pages.
Chanda, A. et al., "ContentFlow: Mapping Content to Flows in Software Defined Networks," in Proc. of IEEE Globecom, Dec. 2013, 9 pages.
Azimdoost, B. et al., "On the Throughput Capacity of Information-Centric Networks," in Proc. International Teletraffic Congress 25, Sep. 2013, 9 pages.
Koponen, T., et al., "A Data-Oriented (and Beyond) Network Architecture," SIGCOMM Comput. Commun. Rev., vol. 37, Aug. 2007, pp. 181-192.
Xylomenos, G., et al., "A Survey of Information-Centric Networking Research," IEEE Communications Surveys Tutorials, vol. 16, No. 2, Jul. 2013, pp. 1024-1029.
Ahlgren, B., et al., "A Survey of Information-Centric Networking," IEEE Comunications Magazine, vol. 50, Jul. 2012, pp. 26-36.
Garcia-Luna-Aceves, J.J., et al., "Content-Centric Networking at Internet Scale through the Integration of Name Resolution and Routing," CoRR, vol. abs/1608.04046, Sep. 2016, 10 pages.
Ghali C., et al., "Living in a Pit-Less World: A Case Against Stateful Forwarding in Content-Centric Networking," CoRR, vol. abs/1512.007755, Dec. 2015, 10 pages.
Broder, A., et al., "Network Applications of Bloom Filters: A Survey," Internet Mathematics, vol. 1, No. 4, May 2004, pp. 485-509.
Sanchez-Hernandez, J., et al., "A Bloom Filter-Based Algorithm for Routing in Intermittently Connected Mobile Networks," Proceedings of the 18th ACM International Conference on Modeling, Analysis and Simulation of Wireless and Mobile Systems, MSWiM, Nov. 2015, pp. 319-326.
Tortelli, M., "CCN Forwarding Engine Based on Bloom Filters," Proceedings of the 7th International Conference on Future Internet Technologies, CFI '12, Sep. 2012, pp. 13-14.
Tsilopoulos, C., et al., "Reducing Forwarding State in Content-Centric Networks with Semi-Stateless Forwarding," IEEE Conference on Computer Communications, IEEE INFOCOM, Apr. 2014, pp. 2067-2075.
Azgin, A., et al., "pit/Less: Stateless Forwarding in Content Centric Networks," IEEE Globecom, Dec. 2016, 7 pages.
Salsano, S., et al., "Information centric networking over SDN and OpenFlow: Architectural aspects and experiments on the OFELIA testbed," Computer Networks, vol. 57, No. 16, Nov. 2013, pp. 3207-3221.
Chanda, A., et al., "Content Based Traffic Engineering in Software Defined Information Centric Networks," Proc. IEEE Infocom NOMEN workshop, Apr. 2013, 6 pages.
Reed, M.J., Traffic engineering for information-centric networks, IEEE International Conference on Communications (ICC), Jun. 2012, 6 pages.
Avci, S.N., "A Content-Based Traffic Engineering Policy for Information-Centric Networks," 13th IEEE Annual Consumer Communications & Networking Conference (CCNC), Jan. 2016, 9 pages.
Su, K., et al., "On the Benefit of Information Centric Networks for Traffic Engineering," IEEE ICC 2014—Next-Generation Networking Symposium, Jun. 2014, 7 pages.
Feng, Z., et al., "Joint Optimization of Content Replication and Traffic Engineering in ICN," 40th Annual IEEE Conference on Local Computer Networks (LCN 2015), Oct. 2015, 9 pages.
Gao, S., et al., "Scalable Area-based Hierarchical Control Plane for Software Defined Information Centric Networking," 23rd International Conference on Computer Communication and Networks (ICCCN), Aug. 2014, 7 pages.
Ren, J., et al., "MAGIC: a Distributed MAx-Gain In-network Caching Strategy in Information-Centric Networks," Proceedings of the IEEE INFOCOM Workshop on Emerging Name-Oriented Mobile Networking Design-Architecture, Algorithms and Applications, Apr. 2014, 6 pages.
Sourlas, V., et al., "Cache-Aware Traffic Engineering in Information-Centric Networks," IEEE 19th International Workshop on Computer Aided Modeling and Design of Communication Links and Networks (CAMAD), Dec. 2014, 5 pages.
Xie, H., et al., TECC: Towards Collaborative In-network Caching Guided by Traffic Engineering, 31st Annual IEEE International Conference on Computer Communications: Mini-Conference, Mar. 2012, 5 pages.
Westphal, C., et al., "RFC7933: Adaptive Video Streaming over Information-Centric Networking (ICN)," IRTF ICN Research Group, Aug. 2016, 37 pages.
Westphal, C., et al., A Stable Fountain Code Mechanism for Peer-to-Peer Content Distribution, IEEE INFOCOM Conference, Apr. 2014, 9 pages.
Westphal, C., et al., "Route Hitting Probability for a Class of Ad Hoc Routing Protocols," 6th International Symposium on Modeling and Optimization in Mobile, Ad Hoc and Wireless Networks and Workshops, Apr. 2008, pp. 475-480.
U.S. Appl. No. 15/426,336, filed Feb. 7, 2017, by Azgin et al.
U.S. Appl. No. 62/430,630, filed Dec. 6, 2016, by Westphal et al.
U.S. Appl. No. 15/448,502, filed Mar. 2, 2017, by Yi et al.

* cited by examiner

DATA UNIVERSAL FORWARDING PLANE FOR INFORMATION EXCHANGE

BACKGROUND OF THE INVENTION

In the traditional TCP/IP (Transmission Control Protocol/Internet Protocol) model, the client requesting some content needs to first map the URL (Uniform Resource Locator) in the name of the content to a server. This server will mostly stay the same for the length of the session. The session is actually bound to this server, and the session's goal is to transfer the specific content held from this server. In such host-centric networking paradigm, the core networking primitives revolve around naming hosts and network interfaces. Network devices can only forward packets according to the destination addresses.

Recently, information-centric networks (ICN) have been proposed. Examples of ICN's include, but are not limited to, Named Data Networks (NDN), Content Centric Networks (CCN), Content Oriented Networks (CON), Data Oriented Networks (DON), and Content Based Networks (CBN). Unlike traditional host-centric networking, information is directly named in an ICN. Thus, an ICN allows a client device to focus on the data needed, as opposed to referencing a specific location from which the data may be retrieved.

For example, in a CCN, a client node may send an interest packet to the network when the client wants to access a content object. Routers in the network then forward the interest packet using the name of the interest for routing. Once the interest packet reaches a cache holding a match for the interest, a content return packet (e.g., "data packet") may be sent back. The content return packet may retrace the path followed by the interest packet in the reverse direction to the client node which requested the content.

SUMMARY

In a first embodiment, there is a device comprising a non-transitory memory storage comprising instructions, and one or more processors in communication with the memory. The one or more processors execute the instructions to receive at a router in an information centric network (ICN) a data packet for first content. The data packet comprises an identifier of second content associated with a first client device. The one or more processors execute the instructions to determine from at least one routing table a first interface associated with the identifier of second content, and to route the data packet for the first content to the interface associated with the identifier of second content in the at least one routing table.

In a second embodiment according to the first embodiment, the one or more processors execute the instructions to, prior to receiving the data packet for the first content: receive at the first interface an interest packet that includes a first content name that describes the first content requested by the interest packet, the interest packet including an advertised content field containing the identifier of second content associated with the first client device; store in the at least one routing table the identifier of second content and the first interface associated with the interest packet; forward the interest packet; wherein the data packet for the first content is received in response to forwarding the interest packet.

In a third embodiment according to any one of the first through second embodiments, the at least one routing table includes a first routing table and a second routing table. The one or more processors execute the instructions to: determine the first interface from a second routing table of the at least one routing table; determine in response to the interest request whether the first routing table contains the first content name and one or more interfaces corresponding to the first content name; and forward the interest packet to one or more interfaces identified in the first routing table if the first routing table contains the first content name.

In a fourth embodiment according to any one of the first through third embodiments, the one or more processors execute the instructions to: map the first content name to a first identifier reflecting the first content using a predetermined coding if the first routing table does not contain the first content name; determine whether the second routing table contains the first identifier and one or more or more interfaces associated with the first identifier; and forward the interest packet to one or more interfaces identified in the second routing table if the second routing table contains the first identifier.

In a fifth embodiment according to any one of the first through fourth embodiments, the one or more processors execute the instructions to add the first content name and the one or more interfaces to the first routing table in response to receiving the data packet from the one or more interfaces if the interest packet is forwarded using the second routing table.

In a sixth embodiment according to any one of the first through fifth embodiments, the one or more processors execute the instructions to: populate the first routing table by one or more routing protocols; and populate the second routing table with a plurality of identifiers of content advertised in interest packets received from a plurality of client devices.

In a seventh embodiment according to any one of the first through sixth embodiments, the one or more processors execute the instructions to respond to an interest packet for the first content with data from a local content store if the local content store contains the first content.

In an eighth embodiment according to any one of the first through seventh embodiments, the identifier of the second content is a filter based on a second content name for the second content; and the filter is included in an advertised content field of the interest request.

In a ninth embodiment according to any one of the first through eighth embodiments, the filter is based on the second content name and one or more additional content names for additional content advertised by the first client device.

In a tenth embodiment, a method is provided that includes forwarding from a node an interest packet for first content. The interest packet includes a first content name that describes the first content and an identifier of second content at a client device associated with the interest packet. The method includes storing in at least one routing table an association between the identifier of second content from the interest packet and a first interface corresponding to the interest packet, receiving at the node a data packet including data for the first content and the identifier of second content, and forwarding the data packet to the first interface based on the association of the identifier of second content with the first interface in the at least one routing table.

In an eleventh embodiment, a non-transitory computer-readable medium storing computer instructions for content routing is provided. The instructions, when executed by one or more processors, cause the one or more processors to route a first interest packet using a first routing table. The first interest packet comprises a first content name that describes first content requested by the first interest packet, and an identifier of second content at a first client device associated with the interest packet. The instruction cause the one or more processors to store in a second routing table an association between the identifier of second content and a first interface corresponding to the first interest packet, receive a second interest packet comprising a second content name that describes the second content, route the second interest packet to the first interface based on the second routing table, and update the first routing table with an entry associating the second content name with the first interface if data for the second content is received in response to routing the second interest packet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
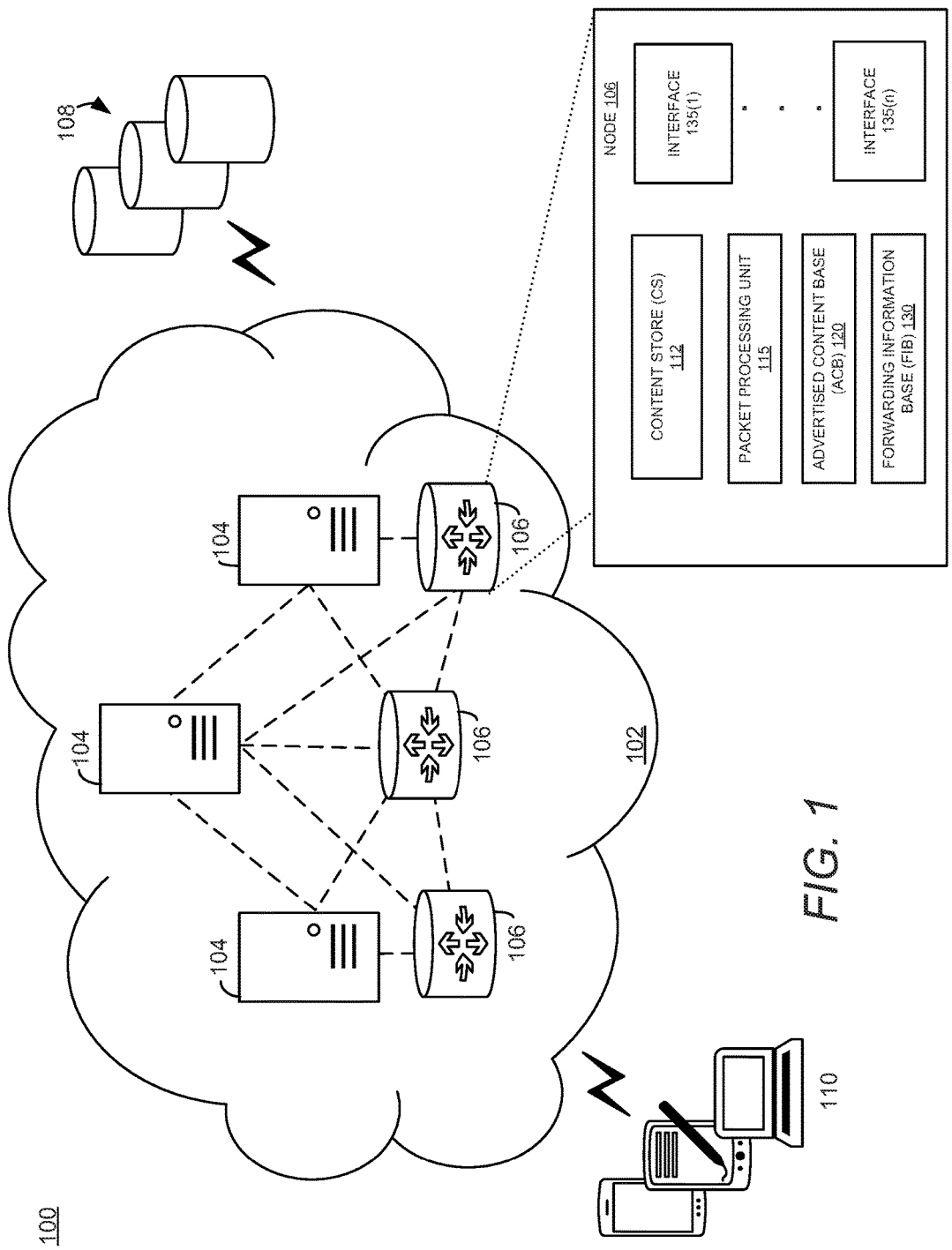
FIG. 1 is a block diagram of a network environment that provides content using an advertised content base in accordance with one embodiment.

The disclosure relates to technology for a data universal control and forwarding plane for forwarding of packets in an information centric network (ICN). The packets include, but are not limited to, interest packets and/or data packets in an ICN. In some embodiments, content requests (e.g., interest packets) and the corresponding data (e.g., data packets) are both routed using content names. This avoids the inherent asymmetry that exists in many conventional architectures for ICN that route interest packets upon data names, but route data packets in the reverse direction based on tracking the originating interest packets.

Some conventional architectures employ stateful forwarding in which the content routers have a pending interest table (PIT). State information in the PIT helps a content router identify outgoing interfaces, also referred to as ports, for data packets (or incoming ports of the associated interest packets). The PIT may be any data structure (e.g., a table, list, or database) used to record and keep track of the received interests (requests for content) that are being served or pending (until the corresponding requested content data is received).

The routers in traditional ICNs forward interest packets based upon the name of the requested content. The interest packet follows a path which resolves the name to the location of a copy of the content, and delivers the "get" message to the copy of the content. The interest leaves a trail of bread crumbs for the data to be delivered following the reverse path of the interest. Each router receiving an interest keeps a Pending Interest Table (PIT) which keeps track of the incoming interface of the interest. When data arrives at the router, it is forwarded to the interface of the incoming interest which requested the data. Routing in this manner creates an asymmetry: the interest packets are routed on content name, while the data packets are routed based upon PIT entries.

In accordance with one or more embodiments of the disclosed technology, interest packets are provided that include a dual control plane and forwarding plane function that avoids the asymmetry associated with traditional ICN routing. For example, the interest packets are used to update the control plane for routing purposes (e.g., setting up routes), as well as to request data from the content caches and providers. While the interest packets still alert the ICN of the incoming data, the interest packets do not specify a return path. Instead, the interest packets include an identifier of other content advertised by the client device issuing the interest packet. An advertised content identifier (ACI) is stored in a data structure with an identification of the corresponding client device. Data packets include the advertised content identifier of the corresponding interest packet, in addition to the name of the requested content. When a data packet is received for requested content, the advertised content identifier is used to determine where to route the data packet.

In some embodiments, interest packets carry a return label with an ACI in addition to the content name of the piece of the content the interest packet is attempting to retrieve. In one embodiment, the return label identifies content advertised by the client device issuing the interest packet. The return label may include an advertised content identifier which is guaranteed to be unique in one example. This allows the client issuing the interest request to be uniquely identified by the return label. This permits the return label to allow the requested content to be routed back to the client. Because the return label advertises other content than that requested by the interest packet, it also allows the client identity to be obfuscated and provides privacy.

In one embodiment, a content router at a node extracts the advertised content identifier (ACI) from an interest packet received on an interface (e.g., ingress port) and stores the ACI in association with the interface in a advertised content base (ACB). In one embodiment, the content identification base identifies the advertised content by the client device issuing the interest packet, and the interface on which the interest packet was received. Data packets include the return label comprising the ACI of the interest packet requesting the corresponding data. When a data packet is received, the router extracts the ACI. The router compares the ACI with the content identification base. The router forwards the data packet to the interface identified by the matching advertised content identifier. In this manner, control of choosing the data path can be returned to an operator that can choose a data path based on its own considerations (e.g., network optimization, shortest path, etc.).

The return label can carry information about the client device and about the information carried by the client. Therefore, the data packets follow a path to a set of content pieces. Namely, the client is identified by the information it carries. This is universally information-centric both on the interest uplink and in the data downlink. Further, use of the ACI has the advantage of sharing with the network, on the path to the server, some routing information towards the content being held at the client. The destination of the packet is defined, in both directions, by the content it holds.

In some embodiments, the ACI is able to inform the network about the location of the content carried by the client (e.g., that the client wishes to advertise). The information can be advertised, even as the client moves about the ICN. In some embodiments, the ACI is additionally used to locate content in the ICN for routing other interest requests. For example, the ACI may be used to route interest packets for other content to the advertising client device. Verification operations can be performed and if the content is validated as reachable through the client device, a standard routing table such as a forwarding information database (FIB) can be updated to reflect the location of the content at the client device.

FIG. 1 illustrates a network environment 100 to provide content as requested by different users in an information centric network (ICN). Herein, the term "ICN" can refer to either an information centric network or information centric networking, depending on the context. The ICN 102 may be, but is not limited to, a Named Data Network (NDN), Content Centric Network (CCN), Content Oriented Network (CON), Data Oriented Network (DON), or Content Based Network (CBN). The network environment 100 may include the ICN 102 having controllers, such as ICN managers 104. The ICN managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISPs).

In one embodiment, the ICN is compliant with a CCN protocol. A CCN protocol emphasizes content by making it directly addressable and routable. Endpoints communicate based on named data instead of IP addresses. CCN is characterized by the basic exchange of content request messages (called "Interests") and content return messages (called "Content Objects"). The Interest message is used to request data by name. Specifically, an Interest message can identify a chunk of content to retrieve. Alternatively, an Interest message can provide a name prefix and other qualifications to restrict what data is acceptable from the collection named by the prefix. Herein, the term "interest packet" includes, but is not limited to an interest message. The Content Object is used to supply data. Herein, the term "data packet" includes, but is not limited to the message that returns a Content Object.

Communication using the CCN protocol is receiver-controlled. A Consumer of data transmits an interest message over available connectivity and any party receiving the message and having data that matches, or satisfies, the request (according to the specifications in the Interest Message) may transmit a matching content object message. Data is only transmitted in response to an interest that matches the data. An Interest message may be transmitted using broadcast or multicast facilities of the underlying transport in order to reach many potential sources of data with minimal bandwidth cost.

ICN 102 may also include nodes 106, which may include storage to cache content as it propagates through the ICN 102. Nodes 106 may be referred to as routers as nodes generally comprise a router, although it is not required that a node include a router. The nodes 106 may also be communicatively coupled with the ICN managers 104 and may be configured to process requests received from users for accessing the content via user devices 110, such as a mobile device or computer.

The nodes 106 may collaborate for caching content with one or more other nodes 106 in the network, such as an ICN, which may be configured as follows. A router 106 may comprise a content store (CS) 112, packet processing 115, local filters 120, forwarding information base (FIB) 130, and input/output (I/O) interfaces 135(1) to 135(n). The I/O interfaces (or ports) are configured to receive and transmit data from/to other nodes. The CS 110 may be used (e.g., in non-transitory memory storage) to cache (for relatively short time) or store (for relatively longer time) content data. The CS 112 may also receive and associate interests (user requests for content) with corresponding content data (requested content).

The FIB 130 may be any data structure (e.g., a table, list, or database) used to associate content with corresponding ports (for next hops) on which the interests and content data are received and forwarded. The FIB 130 entries may indicate the next hops on which content (interests and data) may be forwarded. THE FIB 130 may be populated by one or more routing protocols and/or rules. The FIB 130 may be a data structure or a sub-data structure (e.g. a data structure within a data structure), such as a table, list, or database which may be maintained and operated (to process content interest and data) at a data plane or forwarding plane. The FIB 130 may be stored in any non-transitory memory storage. The data plane may comprise operations for transferring content information (interest and data) in the CON, and the control plane may comprise operations related to controlling network operations including the data plane operations. The data structures above may be stored and maintained in a storage or memory unit of the router 106.

Note that the node 106 in FIG. 1 for which individual components are depicted does not have a PIT. At least some nodes 106 in the ICN perform forwarding of packets without a PIT, instead relying on advertised content identifiers. However, note that some nodes 106 could have a PIT, and may perform stateful forwarding. For example, some nodes 106 at the edge of the ICN 102 could perform stateful forwarding using a PIT.

Node 106 includes a packet processing unit 115 and an advertised content database 120, which may be used to forward interest and/or data packets. Packet processing unit 115 may be any hardware and/or software that performs the functions recited. Packet processing unit 115 forwards interest packets to an interface identified in the FIB and/or ACB. The packet processing unit determines from an entry in the FIB (and/or ACB as described hereinafter) one or more interfaces corresponding to the requested content name. Node 106 forwards the interest packet to the one or more identified interfaces.

Additionally, node 106 extracts an advertised content identifier (ACI) from the interest packet. The ACI is provided in the packet, in addition to the content name of the requested content object. The ACI corresponds to content advertised as available at the client device issuing the interest packet, rather than the requested content object indicated by the content name. Node 106 stores the ACI in advertised content database (ACB) with an association with the interface on which the interest packet was received. When a data packet is later received that includes the ACI, node 106 determines the interface(s) on which to forward the data packet from the ACB. Packet processing unit 115 may route interest packets based on an interface identified in the advertised content database as corresponding to the requested content of the interest packet. In such cases, packet processing unit 115 may update FIB 130 when a data packet is received in response to the interest packet, verifying that the requested content was retrieved over the interface.

The ACB may be any data structure (e.g., a table, list, or database) used to record and keep track of the advertised content identifiers extracted from interest packets. The ACB entries may indicate the interface on which to forward a data packet. The ACB may be a data structure or a sub-data structure (e.g. a data structure within a data structure), such as a table, list, or database which may be maintained and operated (to process content interest and data) at a data plane or forwarding plane. The ACB may be stored in any non-transitory memory storage. The data plane may comprise operations for transferring content information (interest and data) in the CON, and the control plane may comprise operations related to controlling network operations including the data plane operations. The data structures above may be stored and maintained in a storage or memory unit of the router 106.

The network environment 100 may further include data stores 108, which may store the content or collections of content, such as files, images, videos, and the like. Data stores may be coupled to a node (not shown). Accordingly, the managers 104 and the routers 106 may communicate with the data stores 108 to provide the content to different users. Additionally, the network environment 100 may include one or more client devices 110, including for example and without limitation, desktop computers, hand-held devices, laptops or other portable computers, network computers, mobile phones, landline phones, and the like.

The client devices 110 may have a processor, a memory (which may or may not be non-transitory), a transceiver, and an antenna (not shown). In particular embodiments, some or all of the functionality described herein as being provided by the client device may be provided by the client device processor executing instructions stored on the memory. Alternative embodiments of the client device may include additional components that may be responsible for providing certain aspects of the client device's functionality, including any of the functionality necessary to support the embodiments of the present disclosure.

The client device 110 represents any suitable end user device and may include such devices (or may be referred to) as a user equipment/device (UE), mobile wireless communication device, wireless transmit/receive unit (WTRU), mobile station, fixed or mobile subscriber unit, pager, cellular telephone, personal digital assistant (PDA), smartphone, laptop, computer, touchpad, or consumer electronics device.

The information centric network 102 may include the hardware and software that provides an information centric network. In one embodiment, the information centric network 102 provides a wireless network. The information centric network 102 may include one or more computer systems. The computer system is a server, in one embodiment. The information centric network 102 may provide wireless communication to client device 110 in accordance with a wireless communication protocol. The information centric network 102 can include a collection of gateways through which wireless traffic passes. The ICN 102 may be compliant with an evolved packet core (EPC). However, the ICN 102 is not required to be EPC compliant. In one embodiment, the ICN 102 includes a Serving Gateway (Serving GW), a Packet Data Network Gateway (PDN GW), a Mobility Management Entity (MME) and a Home Subscriber Server (HSS). However, it is not required to include these elements in the ICN 102.

Although FIG. 1 illustrates one example of a communication system, various changes may be made to FIG. 1. For example, the network environment 100 could include any number of client devices 110, nodes 106, managers 104, data stores 108, or other components in any suitable configuration.

Figure 2:
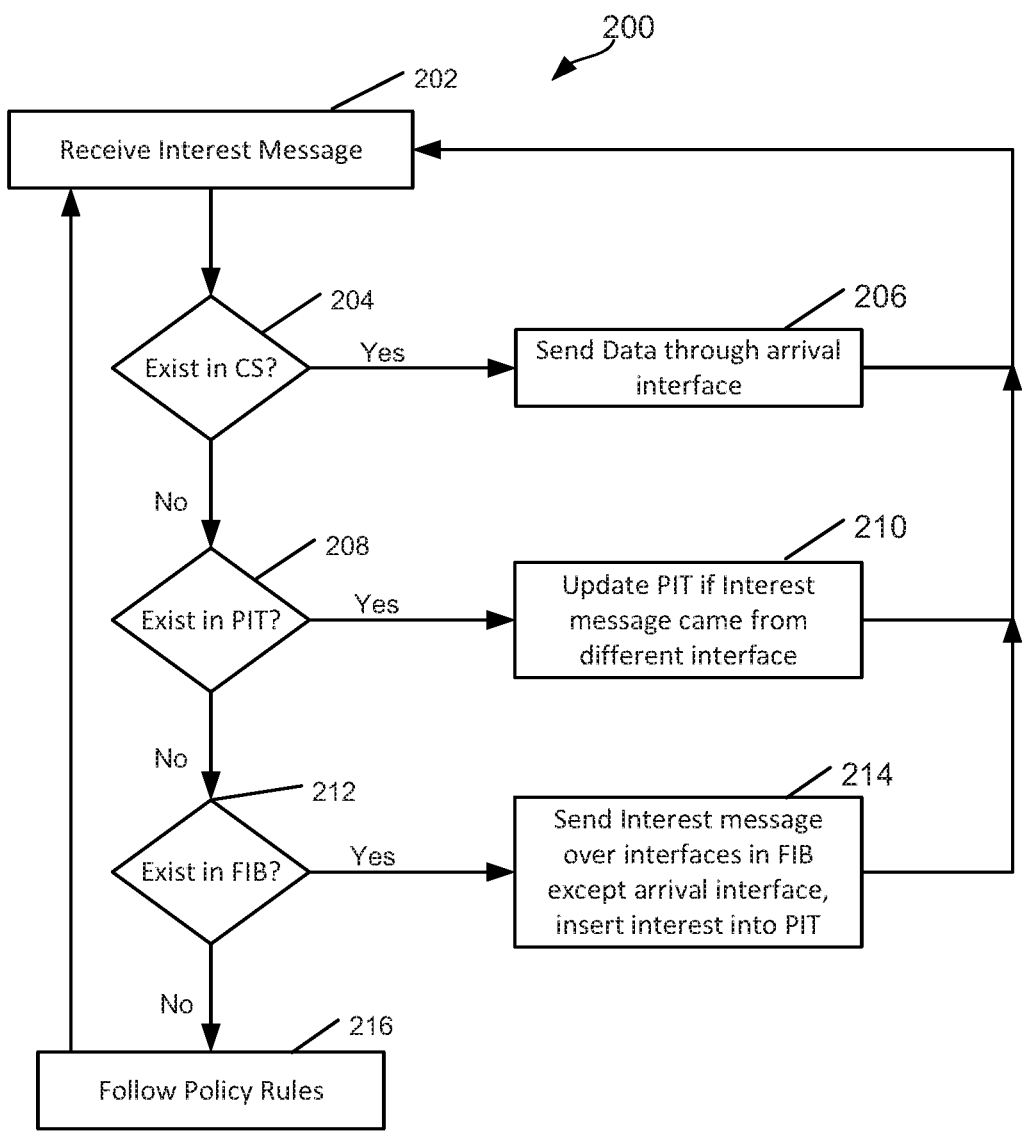
FIG. 2 is a flowchart of a conventional process for processing an interest message according to a CCN/NDN protocol.

FIG. 2 shows a conventional process 200 for handling an interest message by a CCN/NDN protocol that uses a pending interest table (PIT), rather than advertised content identifiers as described herein. A conventional router may include a PIT, in addition to a content store, FIB, and interfaces. When an interest message is received at step 202 on an ingress port (arrival interface), a lookup is performed in CS 110 at step 204. If a matching content object is found, it will be transmitted out of the arrival interface at step 206 as a response to the interest message. To match, a content object must satisfy all of the specifications given in the interest message. Multiple content objects may simultaneously match in which case the specification in the Interest Message will be used to determine which content object to return. When a match is found in CS, processing stops and the interest message is discarded.

If there is no match at CS, a lookup is performed in the PIT at step 208. If a matching interest message is found in PIT, an equivalent interest message has already been forwarded and is pending. The ingress port of the new interest message is added to the list of sources of unsatisfied interests in PIT at step 210 and the interest message is discarded.

If there is no match at PIT, a lookup is performed in FIB at step 212. If a matching prefix is found in FIB, an entry is created in the PIT identifying the ingress port of the interest message and the message is transmitted according to the strategy rules to one or more of the outbound ports registered for the prefix in FIB at step 214. A PIT entry may also include the egress port or ports over which the interest is forwarded.

If no match is found in the previous steps, then the node has no way to satisfy the interest message at present. Policy rules may be followed at step 216 to handle this situation. The interest message may be held for a short time before being discarded, and the creation of a new FIB 130 entry at step 206 may provide a way to satisfy the interest message. As shown above, CCN content names are not interpreted in the operation of the CCN protocol itself, just matched. All assignment of meaning to names or their component parts comes from the application, institution, and/or global conventions reflected in prefix forwarding rules.

Figure 3:
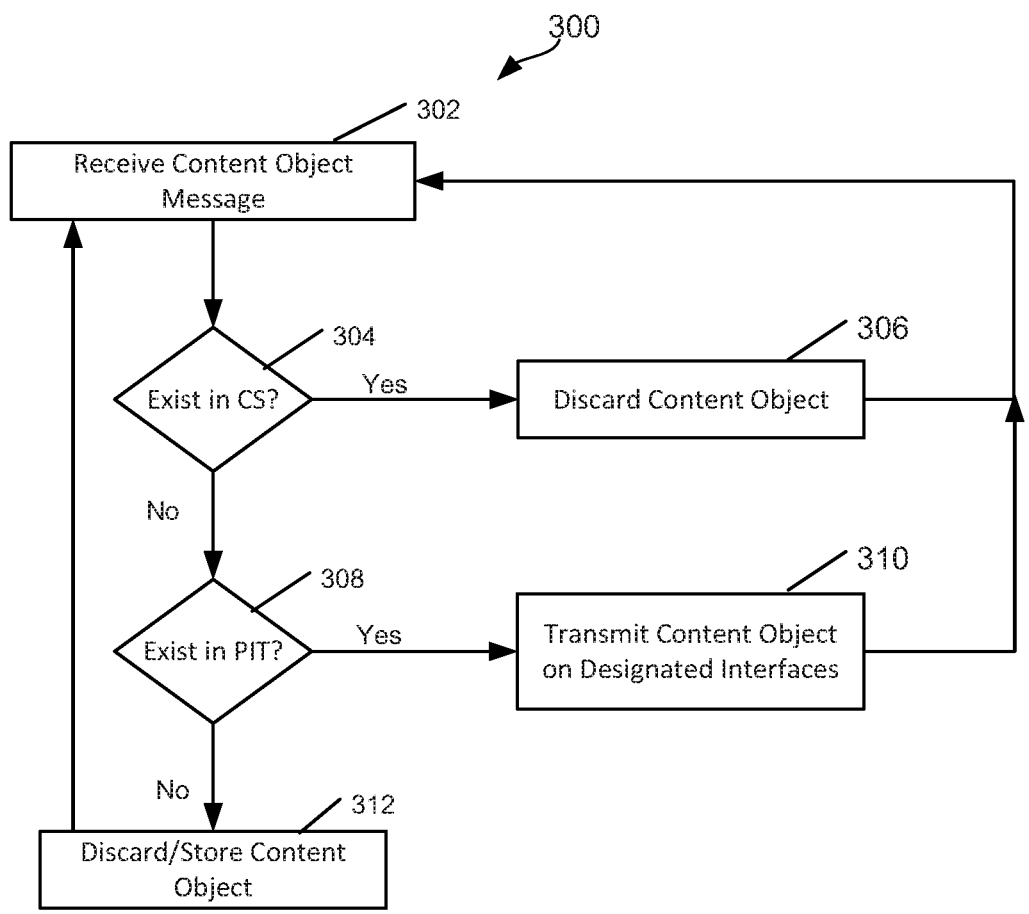
FIG. 3 is a flowchart of a conventional process for processing a content object message by a CCN/NDN protocol.

FIG. 3 shows a conventional process 300 for handling content object messages by a CCN/NDN protocol. The process 300 may be used in combination with the conventional process 200 of processing an interest message shown in FIG. 2. A content object message is received at step 302. A lookup is performed in CS at step 304. If a matching content object is found it means that the newly arrived content object is a duplicate which can safely be discarded at step 306, because any Interest Messages have already been satisfied and new ones will be satisfied out of CS.

If there is no match at CS, a lookup is performed in PIT at step 308. If there is a match in PIT, the content object is transmitted at step 310 on all of the source interfaces for the Interests represented in PIT. A node may perform verification of the content object before forwarding it and may apply various policy restrictions. The content object is then cached at CS.

If no match is found in PIT, then the content is unsolicited. A node may not forward unsolicited data. At step 312, the unsolicited data may be discarded or may be stored in CS in case it is subsequently requested.

The asymmetry of traditional ICN routing as described in FIG. 2 and FIG. 3 may create various issues in the network. The PIT may become a vector for Denial of Service attack. The PIT can be populated with many illegitimate entries so that legitimate ones are dropped off once it is filled up. Losing the PIT state at any one node on the path results in the packet being dropped, without possible recovery until another interest is sent. The data packets follow the path established by the corresponding interest packets, resulting in a symmetrical data path. While this symmetrical data path can provide some value, it removes the operator's flexibility in choosing the best path for a data packet.

Further, the path found by the interest packet corresponds to a name resolution operation. Given a name, the network returns a location. The name resolution operation may not result in the best path for the data. Indeed, if an operator chooses to forward interests for data that is locally unknown up to some node that has a wider view of the network, then this node would receive a disproportionate amount of traffic.

Further, the PIT is supposed to eliminate redundant interests by aggregating them. Namely, it should update the PIT if a new interest arrives for the name of an existing entry and not forward this new interest further. It should then bifurcate the data response to both requests. However, the value of the PIT to aggregate interests may only be marginal.

Figure 4:
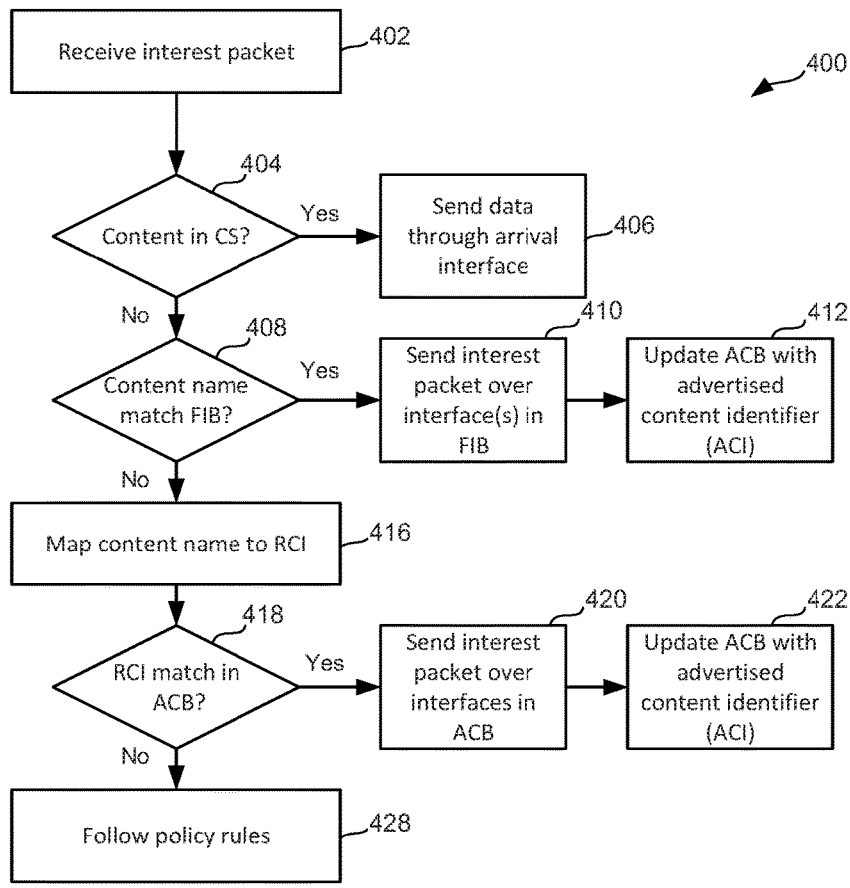
FIG. 4 is a flowchart describing processing an interest packet in accordance with one embodiment.

FIG. 4 is a flowchart of a process 400 for process an interest packet in accordance with one embodiment of the disclosed technology. The interest packet may be transmitted in n interest message, and hence may be referred to as an "interest message". The interest packet is compliant with an ICN protocol in one embodiment. The process 400 may be used in a CCN, but is not limited to CCN. In one embodiment, the interest packet is compliant with an NDN packet format specification. However, the interest packet is not required to be compliant with an NDN packet format specification.

Note that process 400 does not require use of a pending interest table (PIT). Instead, interest messages (e.g., ICN interest messages) are forwarded based on an advertised content identifier provided in the interest packet by the client device. Process 400 may be practiced in the environment 100 of FIG. 1, but is not limited thereto. The process 400 may be performed by various elements (e.g., routers 106) in FIG. 1, but is not limited to that example network environment 100. For example, a single router 106 may perform all of the steps in process 400. Note that multiple routers 106 may perform the process 400 to route the interest message.

When an interest packet is received at step 402 on an ingress (otherwise referred to as arrival or inbound) port or interface 135, a lookup is performed in CS 112 at step 404. If a matching content object is found, it may be transmitted out of the arrival interface at step 406 as a response to the interest packet. Multiple content objects may match, in which case the specification in the interest packet may be used to determine which content object to return. When a match is found in CS 112, processing stops and the interest packet is discarded.

If there is no match at CS 112, a lookup may be performed in FIB 130 at step 408. The node may look up the FBI for an entry having a matching prefix to that of the requested content name. If a matching prefix is found in FIB 130, the interest packet is transmitted according to the strategy rules to one or more of the egress interfaces 135 registered for the prefix in FIB 130 at step 410.

At step 412, the node updates an advertised content base (ACB) with an advertised content identifier (ACI) of the interest packet. The node extracts the ACI from an advertised content header or field (ACF) of the interest packet. The ACF defines a return label for the interest packet. It is noted that the ACI is distinct from the content name of the data being requested by the interest packet. In one embodiment, the ACI is defined by the content that the client is advertising, not the content that is being requested by the interest packet. The ACI may represent content that is available from the source of the interest packet. For example, the ACI may represent a combination of data advertised as present at the client device issuing the interest data packet.

In one embodiment, the ACI is a value such as a Bloom Filter created by hashing content names from the client device into a hashed content identifier that is placed into the ACF by devices issuing interest requests. The content advertised by a client can be guaranteed to be unique by including a unique global user identifier (GUID) in the hash value. It is noted that techniques other than hashing can be used to map content names at a client device into a unique advertised content identifier. The node updates or adds the ACI extracted from the interest packet into the advertised content data base (ACB). The ACB may include an entry that associates the extracted ACI with the ingress interface on which the interest packet was received. Thus, the ACB may be used to route data for the interest packet back to the client. The ACB allows data packets sent with the ACI to be routed back to the client. In this manner, the ACI can be used as a return source address for the data requested by the interest, while the content name of the data requested by the interest request can be used as the destination address.

ACI entries may be kept for a period of time. In one example, time is slotted such that there is a current ACI entry for the ACF received during the current time slot. A predetermined number (e.g., 3) time slots can be kept as well. The length of the time slot can depend of the rate of ACF arrival and the risk of false positives. In another example, a counter can be incremented each time a new ACF is included in the entry. Once the counter reaches a certain threshold, a new ACI entry can be created (and the current ACI is kept for some predetermined time). In another example, an ACI entry is obsoleted when the number of false positives (or the number of interest packets forwarded that receive no response) during a window of time exceeds a threshold.

If there is no match of the requested content name in the FIB, the node maps the requested content name to a request content identifier (RCI) at step 416. Any suitable mapping using a predetermined coding to map the content name into a value can be used. As with an ACI, the RCI can be a Bloom Filter value created by hashing the requested content name into a hashed content identifier.

At step 418, the node determines whether the RCI matches any ACI entries in the ACB. Step 418 may include determining if the RCI value matches directly with an ACI value, or whether the RCI is identified by an ACI. For example, an ACI may represent a combination of content or a list of content advertised by a client. Step 418 may include determining if the RCI value matches to any content advertised by the client as reflected in the ACI value. If the requested content identifier matches an entry in the ACB, the interest packet is forwarded over the interfaces registered in the ACB for the corresponding RCI at step 420. The content name or RCI can be kept with the ACI entry. As described in more detail hereinafter, if a data packet is received after routing an interest packet based on the ACB, the content name can be listed in the FIB with the interface on which the data packet was received. The positive result of routing serves as a validation that the advertised content identifier actually identifies valid content.

At step 422, the node extracts the advertised content identifier from the interest packet and updates the ACB with an association between the ACI and the ingress interface on which the interest packet was received.

If no match is found in the previous steps, then the node has no way to satisfy the interest packet at present. Policy rules may be followed at step 428 to handle this situation. The interest packet may be held for a short time before being discarded, and the creation of a new FIB 130 entry at step 428 may provide a way to satisfy the interest packet.

In one embodiment, determining an interface for routing an interest packet can prioritize the ACB over the FIB. For example, a node may first determine if there is an ACI in the ACB corresponding to an identifier (RCI) of an interest packet requested content name. If so, the interface from the ACB can be used. The ACB may return more local results and thus may improve network performance. There should be no issue of flooding the ACB. If several RCI's are received from a single interface, they can be added into the ACI corresponding to the interface by OR-ing the RCI with the interface's ACI entry.

Figure 5:
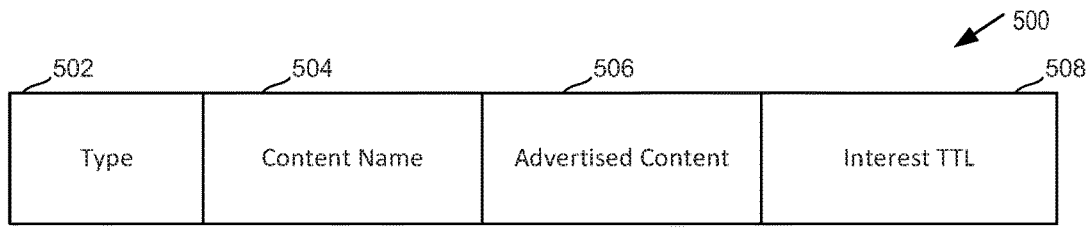
FIG. 5 is a block diagram of a portion of an interest packet in accordance with one embodiment.

FIG. 5 depicts of a portion of an interest packet 500 in one embodiment. The interest packet 500 includes a type field 502, which in this case is set to "Interest" to indicate that this is an interest packet. Note that this field 502 could be "Data" or "Content Object" if the packet were instead a data packet. The content name field 504 includes the name of the content object being sought or requested.

The advertised content field 506 includes an advertised content identifier (ACI) to uniquely identify the client device that issued the interest packet. The ACI is a return address and also an indication of content reachable at or through the client. Each ACI may include a global user identifier (e.g., included in a configuration file to be viewed as content) so that the ACI is unique and maps to a single client device only.

The ACI is based on content carried by the client device in one embodiment. It is noted that the ACI is based on content carried or present at the client device, which is distinct from the content name of the content being requested by the interest packet. The advertised content field 505 defines a return label for the interest packet, as well as advertises content that is carried by the client device.

In one embodiment, each piece of content in the network can be ensured to have a unique content name. The unique content name advertised by a particular client device can be mapped (e.g., hashed) into a hashed content identifier that is placed into the advertised content field of the interest packet. In one embodiment, the ACF can include a list of items, such as a list of content identifiers. In one embodiment, several content names can be aggregated into one advertised content identifier ACI. For example, multiple content names can be hashed onto a bloom filter.

The ACI may not identify any device in particular as the ACI may be different from packet to packet. For example, the ACF may always include the GUID hashed into a Bloom Filter, and then a list of other files which would obfuscate the identity of the client. In one embodiment, the ACF does not include any unique file or GUID. Instead, the ACF may be validated hop-by-hop by the routers which process the interest request. If a false positive is included in an ACB at a router an ACF, then the interest can be dropped, or returned with a NACK ("invalid ACF").

The time to live (TTL) field 508 includes a TTL value defining how long a node should keep the interest packet open. If an interest packet is not resolved by a data packet within the TTL, it can be discarded. The TTL field can be used to avoid routing loops, particularly in situation s where there is no router to ensure that no loop exists.

Figure 6:
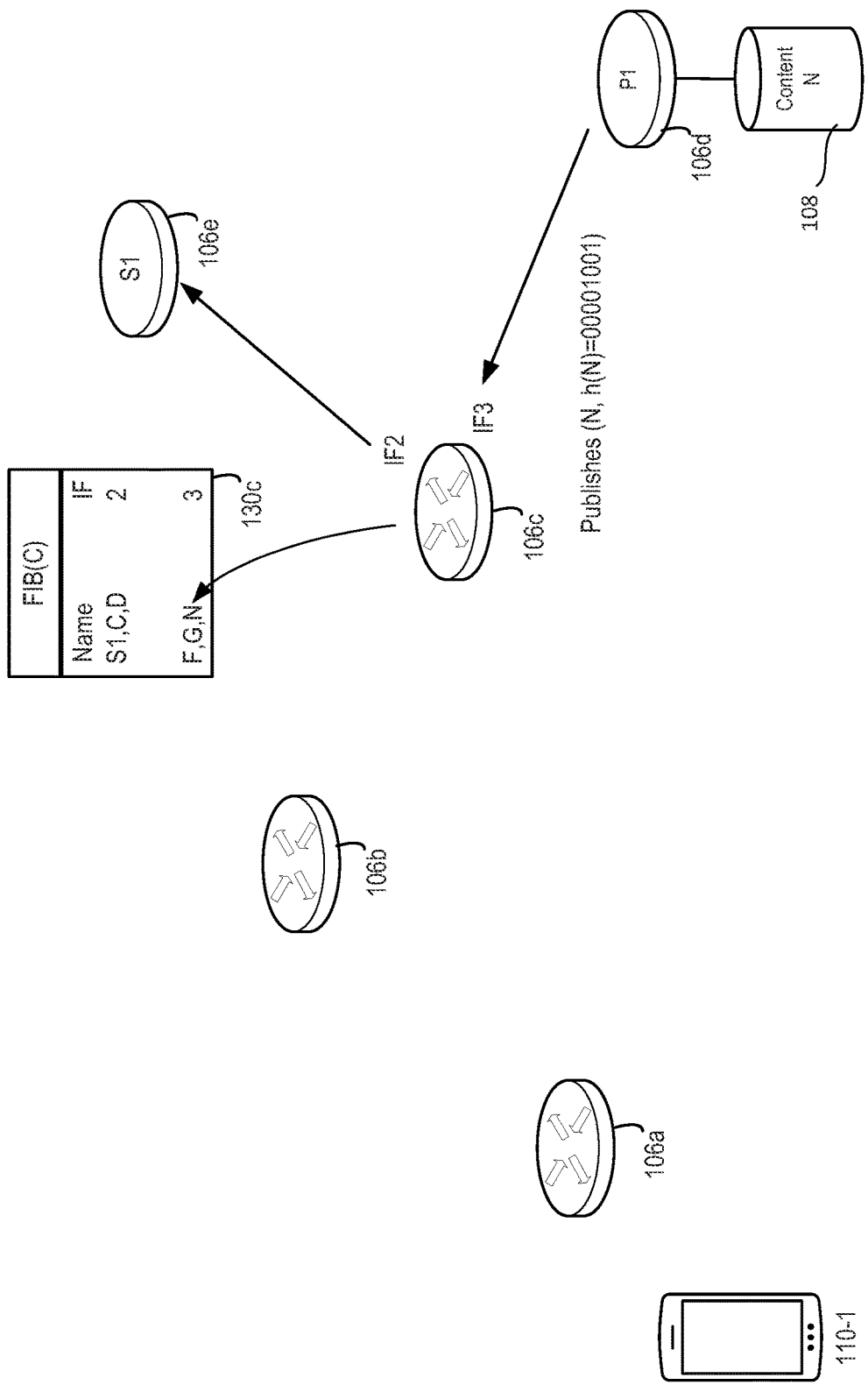
FIG. 6 is a block diagram depicting a flow of a packet for publishing content to an information centric network.

FIG. 6 depicts a network flow describing publishing of content by a producer. Producer P1 at node 106*d* registers its content N with the ICN. In one embodiment producer P1 advertises a prefix corresponding to content object N to the network, or to a subset of nodes on the network. In FIG. 6, producer P1 advertises the prefix '00001001' representing a hash or mapping of content N, to a subset of name resolution nodes, denoted S1 at node 106*e* in FIG. 6. The prefix passes through router 106*c*, which updates its local routing table FIB(C) 130*c* to note that content N can be accessed by routing packets over interface IF3. The FIB at router 106-3 already denotes that name resolution node S1 and content C and D can be accessed over IF2, and content F and G can be accessed over IF3.

Figure 7:
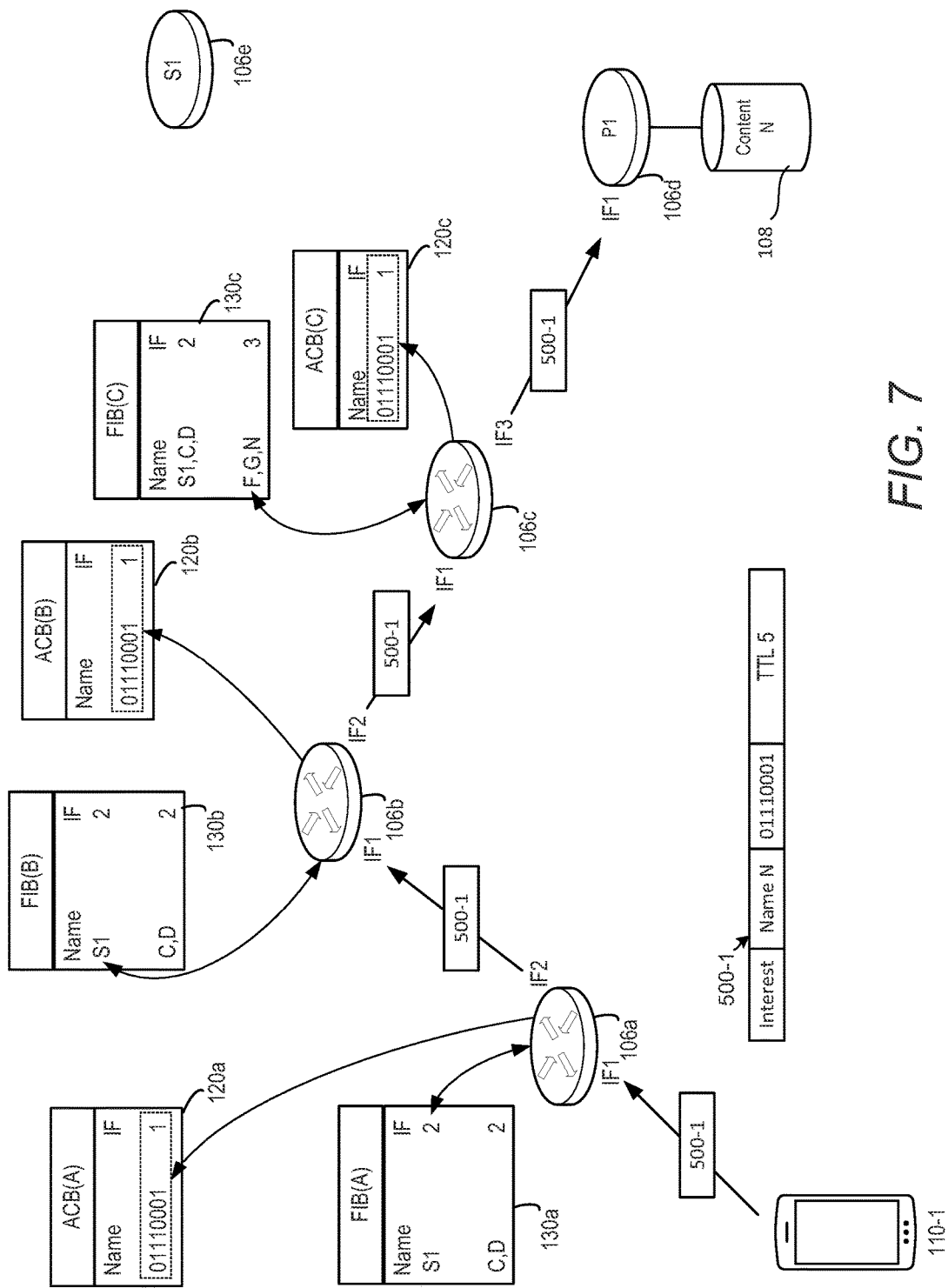
FIG. 7 is a block diagram depicting a flow of an interest packet in accordance with one embodiment.

FIG. 7 depicts a flow of an interest packet 500-1 in accordance with one embodiment. The flow is simplified for ease of illustration. There may be more nodes 106 along the path that process the interest packet 500-1. The flow provides details for one embodiment of steps 410-412 of FIG. 4. The flow describes processing of an interest packet from a client device 110-1 using an advertised content identifier (ACI). The ACI is used as a return label to facilitate subsequent routing of a data packet back to the client device The client device 110-1 sends an interest packet 500-1, which is received by node 106*a* at port 135*a*. Interest packet 500-1 includes a requested content name N in the content name field. The interest packet includes in the advertised content filed an ACI "01110001." In contrast to the content name N which identifiers requested content, the ACI identifies content advertised by the client device 110-1 and is used as an identifier to route subsequent traffic to the client device 110-1. The interest packet includes a TTL value of 5.

The interest packet is received on interface IF1 at node 106*a*. Node 106*a* accesses the content name N in the interest packet and performs a lookup in the local forwarding information base FIB(A) 130*a*. In this case, the local routing table FIB(A) does not contain an entry with the content name N. Because an entry is not found in the FIB(A) for N, node 106a determines whether an entry exists for a name resolution node that may contain routing information for N. In this case, node 106a forwards the interest packet toward name resolution node S1 on IF2 as determined from FIB(A). Additionally, node 106a adds an entry into the ACB(A) routing table, listing ACI "01110001" in association with interface IF1 on which interest packet 500-1 was received.

The interest packet is next received on interface IF1 at node 106b which performs a similar set of operations as node 106a. Node 106b determines that content name N is not in FIB(B). Node 106b forwards the interest packet toward S1 on IF2 as determined from FIB(B). Additionally, node 106b adds an entry into the ACB(B) routing table, listing ACI "01110001" in association with interface IF1 on which interest packet 500-1 was received.

The interest packet is next received on interface IF1 at node 106c. Node 106c previously populated FIB(C) with routing information for content name N in response to producer P1 publishing the content to name resolution node S1. Node 106c determines that content name N is listed in FIB(C), and is associated with interface IF3. Accordingly, node 106c forwards the interest packet toward producer P1 on IF3. Thus, the interest packet is forwarded from the requesting client device 110-1 to a destination node 106d containing the requested content object. Node 106c adds an entry into the ACB(C) routing table, listing ACI "01110001" in association with interface IF1 on which interest packet 500 was received.

Figure 8:
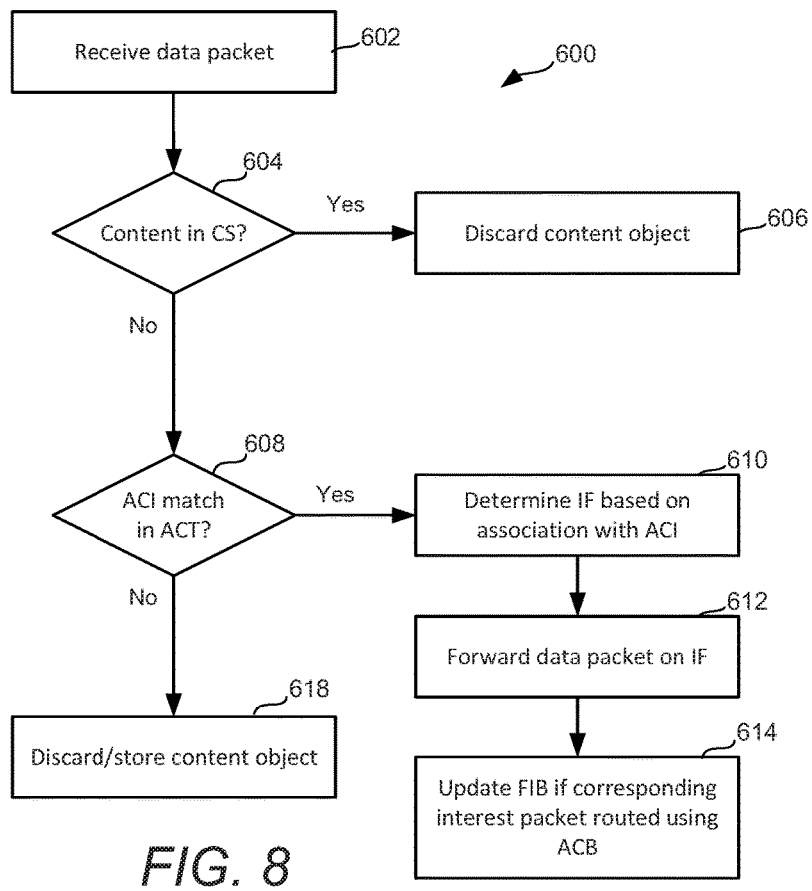
FIG. 8 is a flowchart describing processing of a data packet in accordance with one embodiment.

FIG. 8 is a flowchart of one embodiment of a process 600 for processing a data packet. The process 600 may be used in combination with one embodiment of the process of processing an interest packet shown in FIG. 4. The flow of process 600 assumes that there is an advertised content identifier (ACI) in the data packet, corresponding to the ACI received in the interest packet for which the data packet was generated. As noted earlier, the ACI in the data packet is distinct from the content name of the requested content being carried by the data packet. The ACI reflects content advertised by the client device when issuing the interest packet with the content name of the requested content.

In one embodiment, the process 600 is compliant with a CCN/NDN protocol. The process 600 is not required to be complaint with a CCN/NDN protocol. The process 600 could be compliant with another ICN protocol. The process 600 is not required to be compliant with any specific ICN protocol. Process 600 may be performed in the environment of FIG. 1, but is not so limited.

A data packet is received by a node 106 at step 602. In one embodiment, the data packet is a content object message. A lookup is performed in CS at step 604. If a matching content object is found it means that the newly arrived content object is a duplicate which can safely be discarded at step 606, because any interest messages have already been satisfied and new ones will be satisfied out of CS.

If there is no match at the CS, the receiving node determines if an advertised content identifier (ACI) of the data packet matches an ACI stored in the ACB at step 608. The node may access the ACI in an ACF of the data packet in one embodiment. If the ACF of the data packet matches an entry in the ACB, the node determines one or more interfaces on which to route the data packet from the corresponding ACB entry at step 610.

At step 612, the node forwards the data packet on the interface(s) determined at step 612. Optionally, the node may cache the content object in the data packet in the CS. In this manner, the node routes the incoming data packet based on a content identifier associated with the client device issuing the corresponding interest packet. The content identifier is independent of the requested content. Instead, the content identifier reflects data advertised or carried at the client device. Accordingly, a content identifier generated by the issuing client device based on content at that client device is used to route a data packet back to the client device in response to an interest packet.

At step 614, the node updates the FIB if a data packet is received in response to an interest packet forwarded using an ACB. In one embodiment, step 614 is performed if the corresponding interest packet was routed using the ACB at step 420 of process 400. As earlier noted, the ACB is populated with advertised content identifiers from earlier interest packets, and the interface on which the corresponding interest request was received. This can be contrasted with information in the FIB routing table which may be populated using routing protocols and rules. As such, the presence of the advertised content at the client device is unconfirmed and may be considered unverified. Accordingly, if a node routes an interest request to an interface based on an entry in the ACB and receives a data packet in response, it may validate that the content is reachable at the interface on which the earlier interest request advertising the content was received.

In one embodiment, if the node receives a data packet in response to the interest packet, the node verifies that the content reflected in the ACB was successfully accessed at the interface on which the earlier interest request advertising the content was received. Having validated the location of the advertised content from advertised in an earlier interest request, the node updates the FIB with the content name for which the data packet was received, and the interface on which the interest packet was forwarded and the data packet received. More details of step 614 are described below.

If no match is found in the CS or ACB, then the content is considered to be unsolicited. A node may be configured not to forward unsolicited data. At step 618, the unsolicited data may be discarded or may be stored in CS in case it is subsequently requested.

Figure 9:
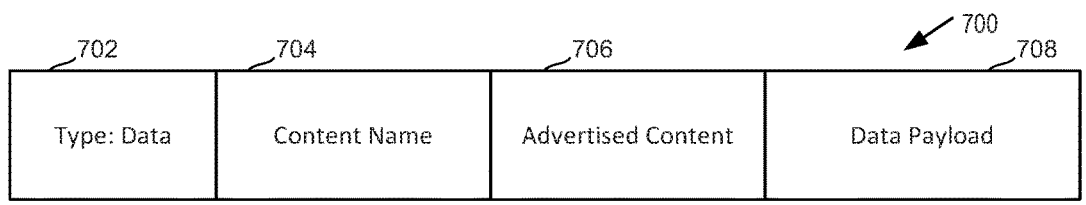
FIG. 9 is a block diagram of a portion of a data packet in accordance with one embodiment.

FIG. 9 depicts of a portion of a data packet 700 in one embodiment. The data packet 700 includes a type field 702, which in this case is set to "Data" to indicate that this is for a data packet. The content name field 704 includes the name of the content object being carried in the data packet. The advertised content field (ACF) 706, also referred to as a destination field, includes the ACI of the corresponding interest packet for which the data packet was generated. The responding node inserts the ACI into the ACF of a data packet to enable the routers to route the data packet back to the client device using the ACI. The data payload field 708 includes the data for the data packet, corresponding to the requested content reflected in the content name field.

Figure 10:
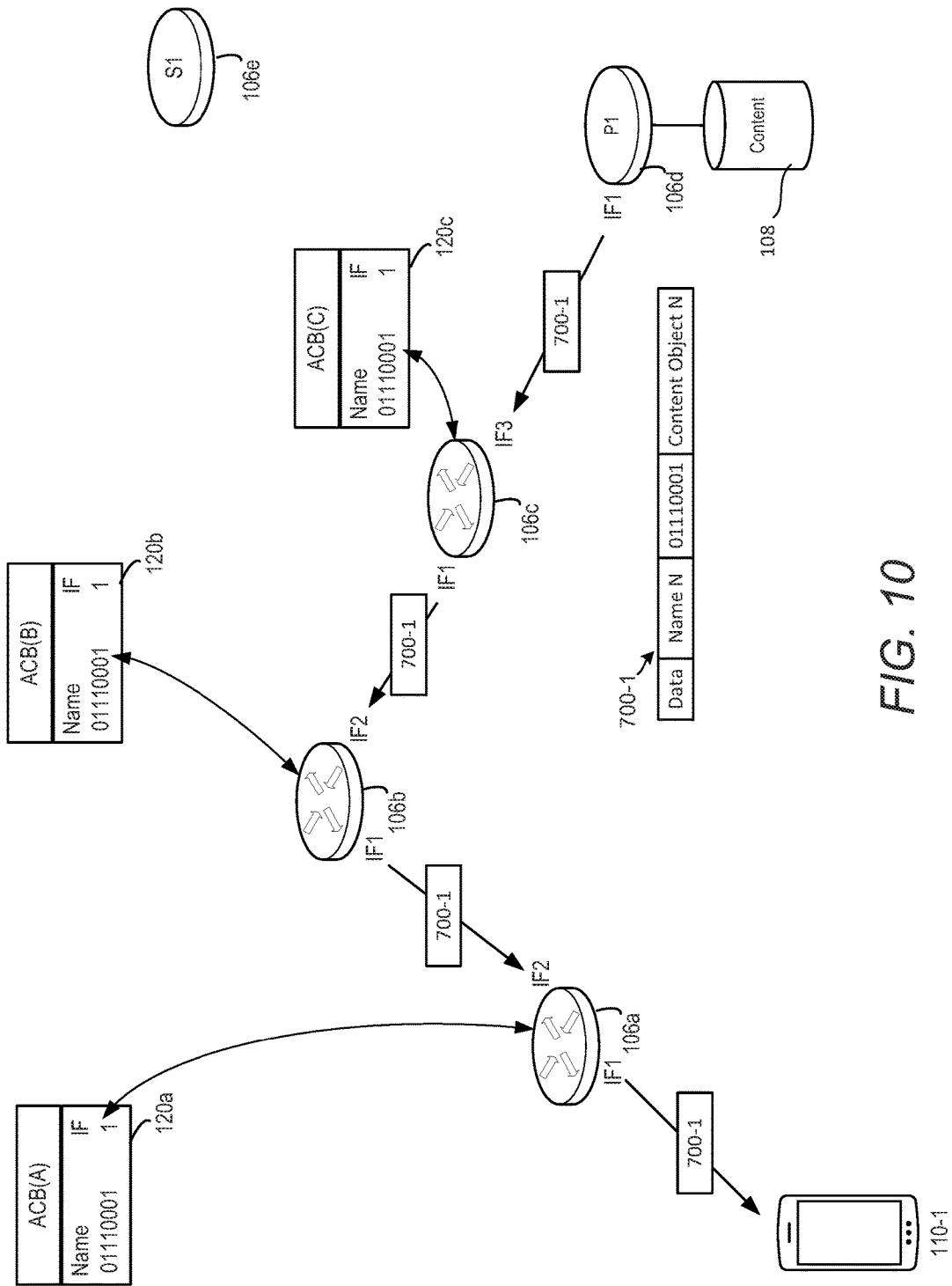
FIG. 10 is a block diagram depicting a flow of a data packet corresponding to the interest packet of FIG. 6 in accordance with one embodiment.

FIG. 10 depicts a flow of a data packet in accordance with one embodiment. In the depicted example, the data packet is returned in the reverse flow as the interest packet depicted in FIG. 7. The nodes in FIG. 10 are the same as those depicted in in FIG. 7

Producer P1 at node 106d generates a data packet 700-1 containing a content object that satisfies the requested content name in the interest packet 500-1. Producer P1 can insert the content object into the data payload field of the data packet. In one embodiment, Producer P1 inserts the ACI of the corresponding interest packet into the ACF (or destination field) of the data packet. In one embodiment, Producer P1 inserts the requested content name into the content name field of the data packet. After generating the data packet based on the interest packet, node 106*d* forwards the data packet 700-1 on interface IF1.

Node 106*c* receives data packet 700 on interface IF3 from node 106*d*. There may be other nodes between nodes 106*c* and 106*d* that are not shown. Node 106*c* extracts the ACI from the data packet 700 and determines what interface the data packet should be forwarded on based on the ACI. In this example, node 106*c* determines that data packet 700-1 should be forwarded on interface IF1. Node 106*c* determines the interface for the data packet by referencing the ACB(C) 120*c* in one embodiment. ACB(C) contains an entry that matches the ACI '01110001' of the data packet. The entry associates ACI '01110001' with interface IF1. The ACB entry containing the ACI and interface IF1 may be created in response to receiving and forwarding the interest packet 500-1 containing the ACI. Although not shown, node 106*c* may first check whether a local CS contains the data in data packet 700. If so, the data packet can be dropped as any interest messages for the content object have already been satisfied and new ones will be satisfied out of the CS as earlier described.

Node 106*b* receives data packet 700-1 from node 106*c*. Similar to node 106*c*, node 106*b* extracts ACI '01110001' from the data packet, after optionally determining whether the local CS contains the content object N of the data packet, indicating that any interest messages have already been satisfied. Node 106*b* determines that the data packet should be forwarded on interface IF1 by matching the ACI in the data packet with the ACI in the ACB(B) 120*b*. In response, node 106*b* forwards the data packet 700-1 on interface IF1.

Node 106*a* receives data packet 700-1 from node 106*b*. As with the earlier nodes, node 106*a* extracts ACI '01110001' from the data packet, after optionally determining whether the local CS contains the content object N of the data packet. Node 106*a* determines that the data packet should be forwarded on interface IF1 by matching the ACI in the data packet with the ACI in ACB(A) 120*a*. In response, node 106*a* forwards data packet 700-1 on interface IF1.

The client device 110-1 receives the data packet 700-1 that was forwarded by node 106*a*. There may be one or more nodes 106 between node 106*a* and the UE 110. Note that some nodes nodes (e.g., edge nodes) may or may not use advertised content identifier, instead relying on a PIT or other means for determining where data packets should be routed.

Figure 11:
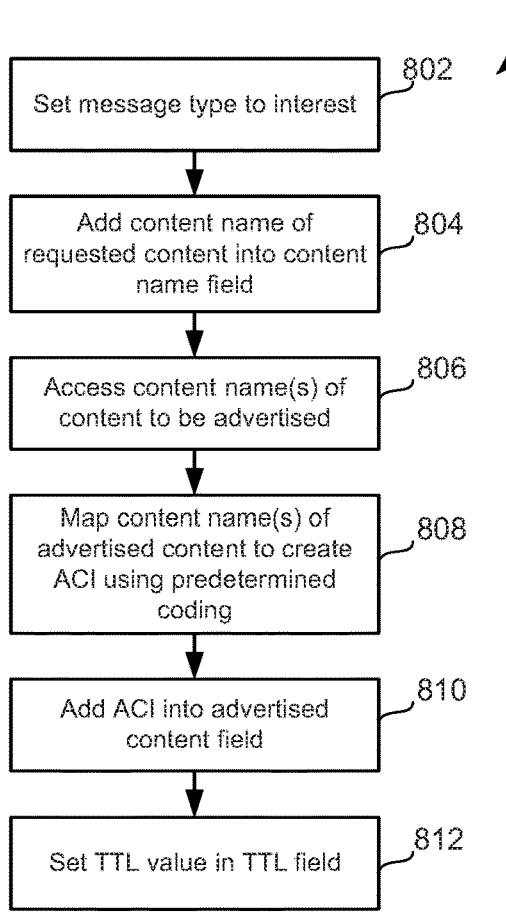
FIG. 11 is a flowchart describing a process of generating of an interest packet in accordance with one embodiment.

FIG. 11 is a flowchart describing a process of interest packet processing by a network device client device. In one example, the process may be used to generate an interest packet that is received at step 402 of process 400 in FIG. 4. Process 800 describes generating an interest packet for first content, where the interest packet includes an advertised content identifier that reflects content that can be accessed at the source of the interest packet. Process 800 may be performed by a client device in one example.

At step 802, the client device sets the message type field to interest to reflect that the packet being generated is an interest packet. At step 804, the client device adds a content name to the content name field. The content name specifies the content that is sought or requested by the interest message. At step 806, the client device accesses one more content names of content at the client device that the client wishes to advertise in the interest message. The content names represent content that can be accessed at the client device. The content names may represent all or a portion of content that is available at the client device.

At step 808, the client maps the one or more content names of the advertised content to create an advertised content identifier (ACI) using a predetermined coding. In one embodiment, the client hashes the one or more content names to create the ACI. Individual content names can be hashed in one example to create a list of items for the ACI. Each item is a mapping of a content name using the predetermined coding. The list of items can be included as the ACI or the list of items can be combined to create an ACI. In another example, multiple content names can be combined and hashed to create an ACI. In one embodiment, the client device aggregates several content names into one ACI using a Bloom Filter. Multiple names can be hashed onto the Bloom Filter and the Bloom Filter can be includes as the ACI.

In one embodiment, the client device ensures that content advertised by the client device is unique. For example, the client device can include a unique global user identifier (GUID). The GUID can be hashed together with the content name(s) to generate the ACI. The ACI may not identify a particular client device since the ACI that is generated can vary from packet to packet. For example, the ACI may include the GUID hashed into the Bloom Filter, and then a list of other files or content names which would obfuscate the identity of the client device. A GUID is not required and is not used in some embodiments.

At step 810, the client device adds the generated ACI into the advertised content field (ACF) of the interest packet. At step 812, the client device sets a TTL value in the TTL field. After generating the interest packet, the client forwards the packet to a node 106 in the network.

Figure 12:
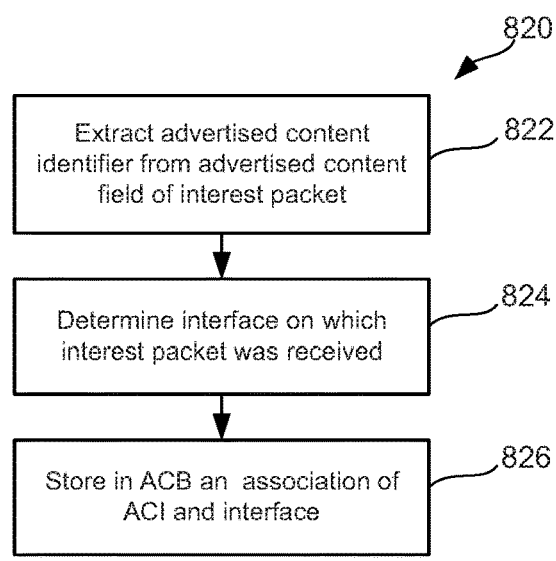
FIG. 12 is a flowchart describing a process of updating an ACB based on an interest packet.

FIG. 12 is a flowchart describing a process of interest packet processing. In one example, the process may be used at step 412 or step 422 of process 400 in FIG. 4. Process 800 describes updating a routing table with an association between an identifier of second content advertised in an interest packet and an interface on which the interest message is received. The interest packet requests first content using a first content name that describes the first content.

At step 802, a node accesses an interest packet that has been received, and extracts the advertised content identifier (ACI) from an advertised content field (ACF) in the interest packet. As earlier described, the ACI is used to identify the source of the interest packet and reflects content that is advertised by the source of the interest packet. The ACI may include a mapping or hash value generated from the content name(s) of content the source wishes to advertise. In this manner, the ACI reflects content carried by the source of the interest packet, not content that is requested by the source of the interest packet.

At step 804, the node determines one or more interfaces on which the interest packet was received. The node will later route data packets corresponding to the interest packet in a reverse flow of routing the interest packet. Accordingly, the node determines the interface on which the interest packet was received in order to later route data packets for the interest packet over the same interface.

At step 806, the node stores in an advertised content base (ACB) an association of the extracted ACI from step 802 with the interface determined at step 804. The association may be stored in any suitable manner to identify that an interest packet including the extracted ACI was received on the corresponding interface.

Figure 13:
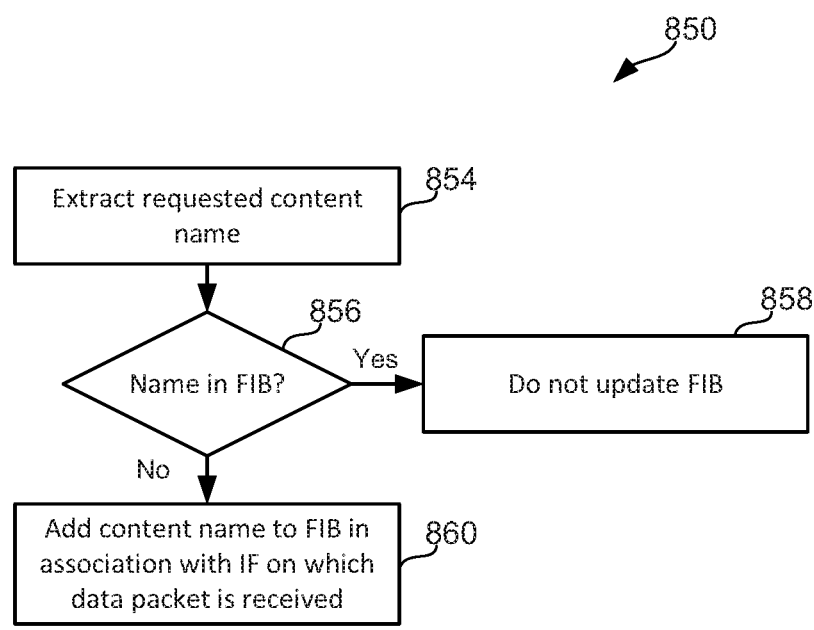
FIG. 13 is a flowchart describing a process of updating an FIB in response to a data packet corresponding to an interest packet routed using an ACB.

FIG. 13 is a flowchart describing a process 850 of data packet processing in accordance with one embodiment. The process in FIG. 13 may be performed at step 614 of FIG. 8 to determine whether to update an FIB after receiving a data packet corresponding to interest packet routed using the ACB. As earlier described, the ACB is generated based on content that is advertised in interest packets issued by client devices. As such, the network may choose to view such content as unverified as the system has not confirmed the presence of the content at the advertising client device. Process 850 describes a process of responding to a data packet to determine whether to update an FIB. If the node determines that the data packet corresponds to an interest packet that was routed based on an unverified entry in an ACB, the node can update the FIB with the routing information in response to verifying that data was received in response to the interest packet.

After receiving a data packet, the node extracts the requested content name in the data packet at step 854. The requested content name reflects the data carried in the payload of the data packet. In one embodiment, step 854 is performed at step 604 of FIG. 8.

At step 856, the node determines whether the requested content name from the data packet is in the FIB. If the content name is listed in the FIB, the node determines that the corresponding interest packet was routed using the FIB. Accordingly, the node does not update the FIB at step 858 since the routing information for the content name is already stored in the FIB. In one embodiment, the node may check whether the FIB includes the IF on which the data packet was received in association with the content name. If it does not, the node can update the FIB to add the interface of the data packet in association with the content name.

If the content name is not listed in the FIB, the node adds an entry in the FIB that associates the content name with the interface on which the data packet was received. If the content name is not listed in the FIB, the node determines that the corresponding interest packet was routed using the ACB. The node verifies in response to receiving the data packet that the routing information in the ACB is correct and reflects a valid path to the content name. In response, the node adds the routing information to the FIB so that future interest requests for the content name can be routed using the FIB, rather than the ACB. The node updates the FIB to add an entry listing the interface on which the data packet was received in association with the content name in the data packet.

Figure 14:
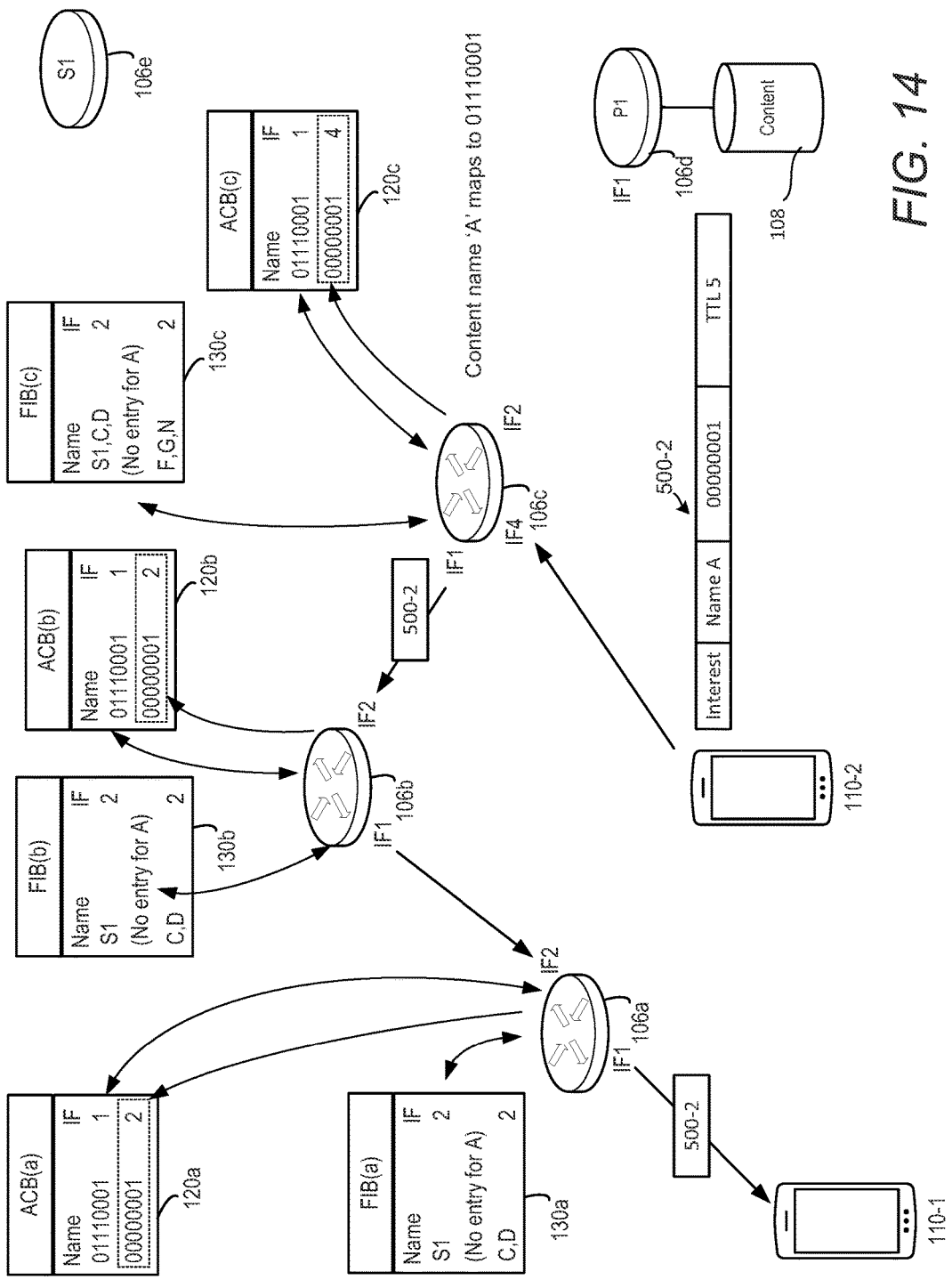
FIG. 14 is a block diagram depicting a flow of an interest packet in accordance with one embodiment.
Figure 15:
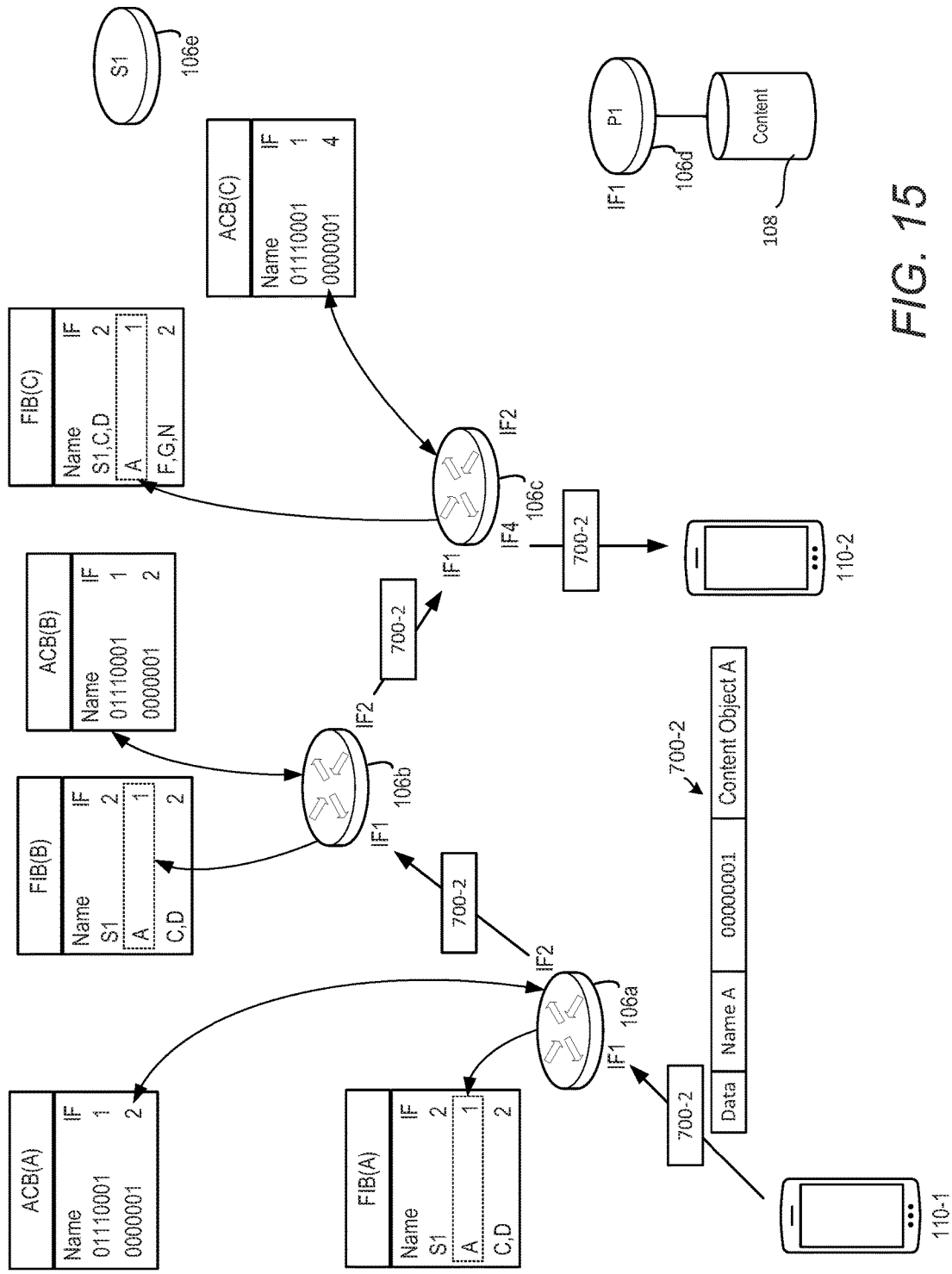
FIG. 15 is a block diagram depicting a flow of a data packet corresponding to the interest packet of FIG. 14 in accordance with one embodiment.

FIG. 14 and FIG. 15 depict routing of an additional interest packet and data packet, subsequent to the routing illustrated in FIG. 7. FIG. 11 and FIG. 12 depict an example of routing an interest packet using an advertised content table, and receiving a data packet in response. Recall that in the example of FIG. 7, client device requested content N, while providing an ACI '0110001.' The ACI provided in interest message 500-1 was stored in the local ACB at each node 106 in order to track and route back the data packet corresponding to the interest packet. The ACI was stored in each local ACB indicating the node on which the corresponding interest packet was received.

The ACI provided by client device 110-1 also advertised content that is available at the client device 110-1. Accordingly, nodes 106 may use the ACB to route interest requests that request data represented by the ACI provided by client device 110-1. In the example of FIG. 11, the ACI '0110001' provided in the interest request 500 of FIG. 7 represents content 'A.' The ACI may be generated by mapping content 'A' to the ACI using a predetermined coding, for example by hashing the content name 'A' to a filter value. It is noted that the filter value may be generated by hashing content name 'A' and other content names or additional information to form the ACI. Accordingly, an ACI may identify one or more content objects. Additionally, the ACF in an interest and/or data packet may contain one or more ACI's.

In FIG. 14, client device 110-2 issues an interest request 500-2 subsequent to routing of interest request 500-1 as shown in FIG. 7. When interest request 500-2 is routed, each ACB stores ACI '01110001' of interest request 500-1. Node 106c receives interest request 500-2 on interface IF4. The interest request includes a content name A. The interest packet also includes an ACI '0000001' identifying content advertised by client device 110-2, and a TTL value of 5. Node 106c accesses the content name A and performs a lookup in the local forward information base FIB(C). In this example, FIB(C) does not contain an entry identifying an interface on which content A can be accessed. Performing a lookup in the FIB is one example of step 408 of FIG. 4. Although not shown, node 106c may first determine that a local CS does not contain a content object to satisfy the interest request (e.g., step 404 of FIG. 4). Additionally, node 106c may also determine that no entry exists for a name resolution node on which to forward the request for resolution, or may choose to route request using the ACB without reference to a name resolution node.

After determining that the interest packet cannot be forwarded using the local routing table FIB, node 106c attempts to forward the interest packet using the local routing table ACB(C). In order to look up content by a content identifier in the format of the ACB, node 106c maps the request content name 'A' to a requested content identifier (RCI). Node 106c can map the requested content name using a predetermined coding as is used to map content at a client device into an advertised content identifier. Hashing or other mapping techniques can be used. In this example, the content name 'A' maps to an RCI that is reflected by the ACI 01110001 in ACB(C). Content name 'A' may map to the exact value of the ACI in the ACB, or it may map to a value indicating that the content name A is reflected in the ACI. For example, where the ACI contains a mapping of multiple content names, the node may determine whether an RCI value is associated with an ACI value without an exact match. Having identified a matching ACI, node 106c determines one or more interfaces associated with the ACI in the ACB.

In response to the matching entry in ACB(C), node 106c forwards the interest packet on the one or more interfaces. Additionally, node 106c adds a new entry into the ACB, associating ACI '0000001' from interest packet 500-2 with the interface IF4 on which the packet was received. In this manner, node 106c uses the ACB to find an interface on which to forward packet 500-2 for the requested content A, as well as to track the pending interest request 500-2 by adding an entry for the ACI of request 500-2.

Node 106b receives the interest packet on interface IF2. After determining that FIB(B) does not contain an entry for content name A, node 106b maps the requested content name 'A' to a requested content identifier (RCI). Node 106b determines that the RCI is reflected by the ACI '01110001' in the ACB(B). The matching entry in ACB(B) indicates that that the content can be accessed via interface IF1. In response to the matching entry, node 106b forwards the interest packet on interface IF1. Additionally, node 106b adds a new entry into the ACB(B), listing the ACI '0000001' in association with the interface IF2 on which the packet was received.

Node 106a receives the interest packet on interface IF2. After determining that FIB(A) does not contain an entry for content name A, node 106a maps the requested content name 'A' to an RCI. The content name 'A' maps to an RCI that is reflected by the ACI '01110001' in the ACB. In response to the matching entry, node 106a forwards the interest packet on IF1. Additionally, node 106a adds a new entry into the ACB(A), listing the ACI '0000001' in association with the interface IF2 on which the packet was received.

The interest packet 500-2 reaches client device 110-1 that has access to a content object to satisfy the interest message 500-2. Note that there may be other nodes between node 106a and client device 110-1. Client device 110-1 accesses the content object that satisfies the interest packet, and generates a data packet that contains the content object. In one embodiment, client device 110-1 extracts the ACI from the interest packet 500-2 and inserts that ACI into the data packet.

FIG. 15 depicts a resulting data packet processing in accordance with one embodiment. The data packet 700-2 may return in the reverse flow as the interest packet 500-2. The client device 110 generates data packet 700-2, containing a content object A in the data payload field that satisfies the requested content name A from the interest packet. Client device 110-1 also adds the content name A, and the ACI '0000001' received in the interest packet. Client device 110-1 then forwards the data packet 700-2.

Node 106a receives the data packet 700-2 from the client device 110. There may be other nodes between nodes 106a and client device 110-1 that are not shown. Node 106a extracts the ACI from the data packet 700-2 and determines what interface the data packet should be forwarded on based on the ACI. In this example, node 106a determines that the data packet 700-2 should be forwarded on interface IF1 by performing a lookup for '0000001' in ACB(A). ACB(A) contains an entry that associates ACI '0000001' with interface IF2. The ACB entry containing the ACI and interface IF2 may be created in response to receiving and forwarding the interest packet 500-2 containing the ACI. Node 106a forwards the data packet on IF2.

Node 106a also updates FIB(A) based on verifying that content 'A' is accessible on interface IF1. The interest request 500-2 was routed to client device 110-1 on interface IF1 based on the ACI entry '01110001' in ACB(A). That entry was generated when routing interest request 500-1 which advertised the content identifier '01110001.' Prior to routing interest request 500-2, node 106a has not verified or confirmed the accessibility of any content represented by ACI '01110001' over interface IF1. In response to receiving the data packet for content A in response to interest packet 500-2, however, node 106a confirms that content A is accessible over interface IF1. Accordingly, node 106a updates FIB(A) by adding that content name 'A' is accessible over interface IF1. Subsequent interest requests for content A can be routed over interface IF1 using the FIB without referencing the ACB.

Node 106b receives the data packet 700-2 from node 106a. Node 106b extracts the ACI from the data packet 700-2 and determines from ACB(B) that the data packet 700-2 should be forwarded on interface IF2 by performing a lookup for '0000001' in the ACB(B). Node 106b forwards the data packet on IF2, and updates FIB(B) based on verifying that content 'A' is accessible over interface IF1. In response to receiving the data packet for content 'A' in response to interest packet 500-2, node 106b confirms that content A is accessible over interface IF1. Node 106b updates FIB(B) by associating content name 'A' with interface IF1. Subsequent interest requests for content A can be routed over interface IF1 using the FIB without referencing the ACB.

Node 106c receives the data packet 700-2 from node 106b. Node 106c extracts the ACI from the data packet 700-2 and determines from ACB(C) that the data packet 700-2 should be forwarded on interface IF4 by performing a lookup for '0000001' in ACB(C). Node 106c forwards the data packet on IF4, and updates FIB(C) based on verifying that content 'A' is accessible over interface IF1. In response to receiving the data packet for content 'A' in response to interest packet 500-2, node 106c confirms that content A is accessible over interface IF1. Node 106c updates FIB(C) by associating content name A with interface IF1. Subsequent interest requests for content A can be routed over interface IF4 using the FIB without referencing the ACB.

Client device 100-2 receives the data packet forwarded by node 106c. There may be one or more nodes 106 between node 106a and client device 110. Note that those nodes (e.g., edge nodes) might or might not use forwarding based on an ACB. Some of the nodes (e.g., edge nodes) could forward the data packet 700-2 using a PIT.

Figure 16:
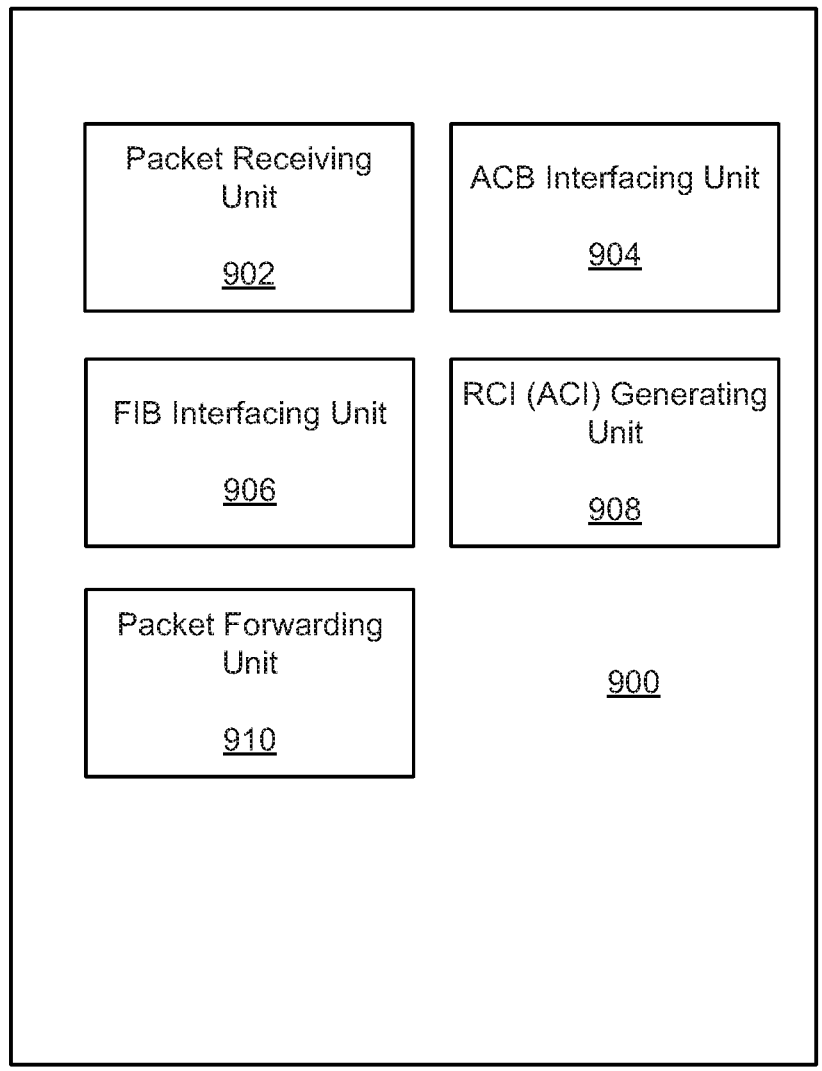
FIG. 16 is a block diagram of a node in accordance with one embodiment.

FIG. 16 is a diagram of one embodiment of an apparatus 900 used to route or forward packets in an ICN. In one embodiment, the apparatus 900 may include a content router as shown at node 106 as shown in FIG. 1. The apparatus 900 may also include a client device or other network device as described above. In certain embodiments, processes 400, 600, 800, 820, and 850 may be performed based on apparatus 900. The apparatus includes a packet receiving unit 902, ACB interfacing unit 904, FIB interfacing unit 906, RCI and/or ACI generating unit 908, and packet forwarding unit 910, in this embodiment. The various units could be implemented with any combination of hardware and/or software.

In general, the packet receiving unit 902 may be configured to receive interest or data packets at interfaces of the apparatus 900. Packet receiving unit 902 is one example of a packet receiving means. Unit 902 is one example of a means for receiving interest and data packets comprising a content name that describes content being requested, as well as an identifier of advertised content available from a client device associated with the interest packet.

The ACB interfacing unit 904 may be configured as part of processing an interest packet to read an ACI from the interest packet and write the ACI to the ACB including an association with the interface of the interest packet. The ACB interfacing unit 904 is one example of a means for storing an association between an identifier of advertised content and an interface corresponding to an interest packet. The ACB interfacing unit may be configured as part of processing a data packet unit to read an ACI from the data packet and determine from the ACB one or more interfaces corresponding to the ACI. The ACB interfacing unit is one example of a means for determining an interface associated with an identifier of advertised content.

The FIB interfacing unit 906 may be configured as part of processing an interest packet to determine whether a FIB contains a requested content name, and if so to return one or more interfaces associated with the content name. The FIB interfacing unit may be configured as part of processing a data packet to update the FIB with routing information for the content name of the data packet if the corresponding interest packet was routed using an ACB. FIB interfacing unit 906 is one example of an FIB interfacing means. FIB interfacing unit 906 is one example of a means for updating an FIB routing table to include an entry associating a content name in a data packet with an interface on which the data packet is received if the corresponding interest packet was routed using an ACB routing table.

The RCI generating unit 908 may be configured as part of processing an interest packet to generate from a requested content name a requested content identifier (RCI). Unit 908 may be configured to map the requested content name to an RCI using a predetermined coding. In one embodiment, unit 908 may hash one or more content names to an RCI. The RCI may include a filter such as a bloom filter in one embodiment. RCI generating unit 908 may also generate advertised content identifiers (ACI) by mapping using a predetermined coding. RCI generating unit 908 is one example of an RCI or ACI generating means. RCI generating unit 908 is one example of a means for mapping (e.g., hashing) one or more content names to a content identifier.

The packet forwarding unit 910 forwards the interest packet on a port of the plurality of ports. Packet forwarding unit 910 is one example of a packet forwarding means. Packet forwarding unit 910 is one example of a means for forwarding (or routing) interest packets using an FIB based on a content name in an interest packet or using an ACB using an identifier generated from the content name. The packet forwarding unit 910 is one example of a means for forwarding (or routing) data packets using an ACB based on an association of an identifier of advertised content in the data packet. The apparatus 900 is not limited to the example units. In one embodiment, the apparatus 900 includes a content store interfacing unit that determines whether a local CS contains a content object to satisfy a requested content name.

The units of FIG. 16 may include or be formed as part of any suitable processing device. The units of FIG. 16 may include or be formed as part of a node 106 and/or a client device 110. For example, a client device may include an ACI generating unit for generating interest packets that include a requested content name, and additionally an identifier of content advertised by the client device.

In some example embodiments, the apparatus 900 may further include one or more elements for performing any one or combination of steps described in the embodiments. In accordance with various embodiments of the present disclosure, the methods described herein may be implemented using a hardware computer system that executes software programs.

Figure 17:
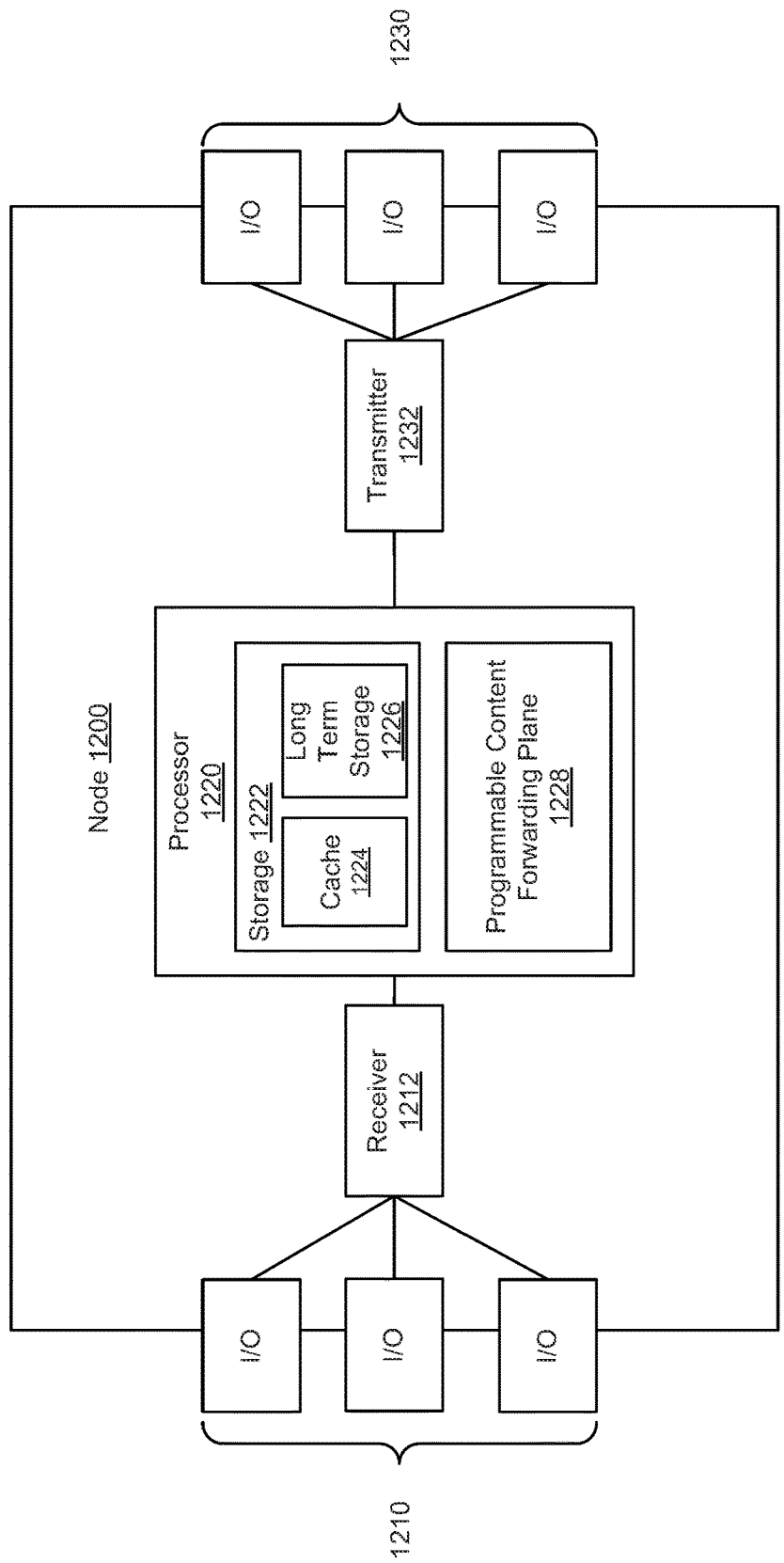
FIG. 17 is a block diagram of network device in accordance with one embodiment.

FIG. 17 illustrates one embodiment of a node 106 (e.g., content router) in accordance with the disclosure. The node 1200 may be, for example, a content router as shown at nodes 106 in FIG. 1 or any other node or router as described above in the ICN. The node 1200 may comprise a plurality of input/output interfaces (ports) 1210/1230 and/or receivers (Rx) 1212 and transmitters (Tx) 1232 for receiving and transmitting data from other nodes, a processing system or processor 1220 (or content aware unit), including a storage 1222 and programmable content forwarding plane 1228, to process data and determine which node to send the data. The node 1200 may also receive Interest messages (or packets) and Data messages (packets) as described above. Although illustrated as a single processor, the processor 1220 is not so limited and may comprise multiple processors. The processor 1220 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1220 may be configured to implement any of the schemes described herein, such as the processes illustrated in FIG. 4, 8, 11, 12, or 13 using any one or combination of steps described in the embodiments. Moreover, the processor 1220 may be implemented using hardware, software, or both.

The storage 1222 (or memory) may include cache 1224 and long-term storage 1226, and may be configured to store routing tables, forwarding tables, or other tables or information disclosed herein. Although illustrated as a single storage, storage 1222 may be implemented as a combination of read only memory (ROM), random access memory (RAM), or secondary storage (e.g., one or more disk drives or tape drives used for non-volatile storage of data).

The programmable content forwarding plane 1228 may be configured to implement content forwarding and processing functions, such as at an application layer or L3, where the content may be forwarded based on content name or prefix and possibly other content related information that maps the content to network traffic. Such mapping information may be maintained in one or more content tables such as a local CS shown above and routing tables such as a FIB and ACB at the processor 1220. The programmable content forwarding plane 1228 may interpret user requests for content and accordingly fetch content, e.g., based on meta-data and/or content name (prefix), from the network or other content routers and may store the content, e.g., temporarily, in storage 1222. The programmable content forwarding plane 1228 may then forward the cached content to the user. The programmable content forwarding plane 1228 may be implemented using software, hardware, or both and may operate above the IP layer or L2.

Figure 18:
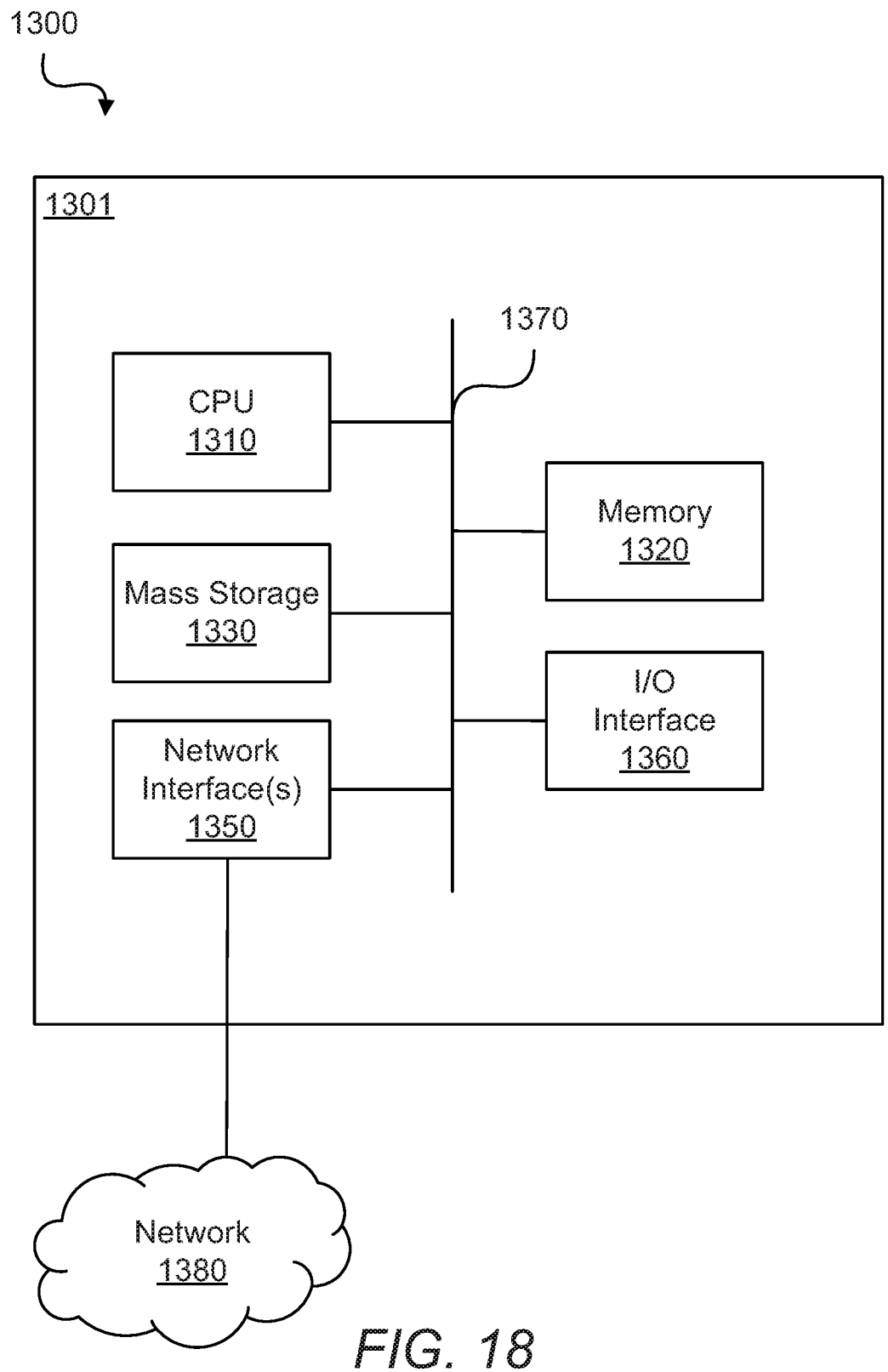
FIG. 18 is a block diagram of a computing system such as a network system.

FIG. 18 is a high level block diagram of a computing system 1300 that can be used to implement various embodiments. In one example, computing system 1300 is a network system 1300. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like. Processing unit 1301 may be used to implement any of the computing devices described herein, such as client devices 110, nodes 106, and/or managers 104.

The CPU 1310 may comprise any type of electronic data processor. The CPU 1310 may be configured to implement any of the schemes described herein, such as the processes illustrated in FIGS. 4, 8, 11, 12, and 13 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit interest packets and/or data packets in an ICN. Herein, the term "network interface" will be understood to include a port.

The components depicted in the computing system of FIG. 18 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The computer-readable non-transitory media includes all types of computer readable media, including magnetic storage media, optical storage media, and solid state storage media and specifically excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. A device, comprising:
a non-transitory memory storage comprising instructions; and
one or more processors in communication with the memory, wherein the one or more processors execute the instructions to:
receive, at a first interface of a router in an information centric network (ICN), an interest packet that includes a first content name that describes first content, the interest packet including an advertised content field containing an identifier of second content associated with a first client device;
store, in at least one routing table, the identifier of the second content and the first interface associated with the interest packet;
forward the interest packet
receive, at the router, a data packet for the first content, the data packet comprising an identifier of the second content associated with the first client device;
determine from the at least one routing table a first interface associated with the identifier of the second content; and
route the data packet for the first content to the interface associated with the identifier of the second content in the at least one routing table, wherein the at least one routing table includes a first routing table and a second routing table;
determine the first interface from a second routing table of the at least one routing table;
determine, in response to the interest packet, whether the first routing table contains the first content name and one or more interfaces corresponding to the first content name;

forward the interest packet to one or more interfaces identified in the first routing table when the first routing table contains the first content name;
map the first content name to a first identifier reflecting the first content using a predetermined coding when the first routing table does not contain the first content name;
determine whether the second routing table contains the first identifier and one or more or more interfaces associated with the first identifier; and
forward the interest packet to one or more interfaces identified in the second routing table when the second routing table contains the first identifier.

2. The device of claim 1, wherein the one or more processors execute the instructions to:
add the first content name and the one or more interfaces to the first routing table in response to receiving the data packet from the one or more interfaces if the interest packet is forwarded using the second routing table.

3. The device of claim 1, wherein the one or more processors execute the instructions to:
populate the first routing table by one or more routing protocols; and
populate the second routing table with a plurality of identifiers of content advertised in interest packets received from a plurality of client devices.

4. The device of claim 1, wherein the one or more processors execute the instructions to:
respond to an interest packet for the first content with data from a local content store if the local content store contains the first content.

5. The device of claim 1, wherein:
the identifier of the second content is a filter based on a second content name for the second content; and
the filter is included in an advertised content field of the interest packet.

6. The device of claim 5, wherein:
the filter is based on the second content name and one or more additional content names for additional content advertised by the first client device.

7. A computer-implemented method for routing in an information centric network (ICN), comprising:
forwarding, from a node, an interest packet for first content, the interest packet including a first content name that describes the first content and an identifier of second content at a client device associated with the interest packet;
storing, in at least one routing table, an association between the identifier of second content from the interest packet and a first interface corresponding to the interest packet;
receiving, at the node, a data packet including data for the first content and the identifier of second content; and
forwarding the data packet to the first interface based on the association of the identifier of second content with the first interface in the at least one routing table, wherein the at least one routing table includes a first routing table and a second routing table and storing the identifier comprises storing the identifier in the second routing table;
determining, in response to the interest packet, whether the first routing table contains the first content name and one or more interfaces corresponding to the first content name; and
forwarding the interest packet to the one or more interfaces identified in the first routing table when the first routing table contains the first content name;
mapping the first content name to a first identifier of first content using a predetermined coding when the first routing table does not contain the first content name;
determining whether the second routing table contains the first identifier and one or more or more interfaces associated with the first identifier; and
forwarding the interest packet to one or more interfaces identified in the second routing table when the second routing table contains the first identifier.

8. The method of claim 7, further comprising:
if the interest packet is forwarded using the second routing table, adding the first content name and the one or more interfaces to the first routing table in response to receiving the data packet.

9. The method of claim 7, wherein the interest packet is a first interest packet, the method further comprising:
responding to a second interest packet for the first content with data from a local content store if the local content store contains the first content.

10. A non-transitory computer-readable medium storing computer instructions for content routing, that when executed by one or more processors, cause the one or more processors to perform the steps of:
route a first interest packet using a first routing table, the first interest packet comprising a first content name that describes first content requested by the first interest packet, the first interest packet comprising an identifier of second content at a first client device associated with the interest packet;
store in a second routing table an association between the identifier of second content and a first interface corresponding to the first interest packet;
receive a second interest packet comprising a second content name that describes the second content;
route the second interest packet to the first interface based on the second routing table; and
update the first routing table with an entry associating the second content name with the first interface when data for the second content is received in response to routing the second interest packet;
receive a first data packet including data for the first content and the identifier of second content;
determine from the second routing table the first interface based on the identifier of second content;
route the first data packet to the first interface based on the second routing table;
determine in response to the second interest packet whether the first routing table contains the second content name;
hash the second content name to a second identifier of the second content using a predetermined coding in response to the first routing table not containing the second content name; and
determine from the second routing table the first interface based on the second identifier.

11. The non-transitory computer-readable medium of claim 10, wherein:
the first interest packet comprises an advertised content field including the identifier of second content; and
the identifier of second content is a filter based on the second content name.

12. The device of claim 11, wherein:
the filter is based on the second content name and one or more additional content names for additional content advertised by the first client device.

13. The device of claim 10, wherein the steps further comprise:
populate the first routing table by one or more routing protocols; and
populate the second routing table with a plurality of identifiers of content advertised in interest packets received from a plurality of client devices.

\* \* \* \* \*